(12) United States Patent
Itou et al.

(10) Patent No.: US 8,253,888 B2
(45) Date of Patent: Aug. 28, 2012

(54) LIQUID CRYSTAL DISPLAY DEVICE

(75) Inventors: Osamu Itou, Hitachi (JP); Tatsuya Sugita, Takahagi (JP); Masaya Adachi, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 344 days.

(21) Appl. No.: 12/709,286

(22) Filed: Feb. 19, 2010

(65) Prior Publication Data

US 2010/0231826 A1 Sep. 16, 2010

(30) Foreign Application Priority Data

Mar. 13, 2009 (JP) ................................. 2009-061226

(51) Int. Cl.
G02F 1/1335 (2006.01)
(52) U.S. Cl. ........................................... 349/65; 349/62
(58) Field of Classification Search ............... 349/61–69
See application file for complete search history.

(56) References Cited

U.S. PATENT DOCUMENTS

| 5,712,694 A * | 1/1998 | Taira et al. ........................ 349/9 |
| 7,265,800 B2 * | 9/2007 | Jagt et al. ......................... 349/61 |
| 2012/0069272 A1 * | 3/2012 | Sugita et al. .................... 349/64 |

FOREIGN PATENT DOCUMENTS

| JP | 2003-007114 | 1/2003 |
| JP | 2008-209857 | 9/2008 |

* cited by examiner

*Primary Examiner* — Dung T. Nguyen
(74) *Attorney, Agent, or Firm* — Antonelli, Terry, Stout & Kraus, LLP.

(57) ABSTRACT

Provided is a liquid crystal display device with a backlight including a light guide plate. The light guide plate includes, a reflective polarizing plate for transmitting a P-polarized component and reflecting an S-polarized component, a reflector for reflecting the S-polarized component reflected by the reflective polarizing plate, and a polarization converting member for converting the S-polarized component to a P-polarized component. The reflective polarizing plate and the reflector are tilted at an angle such that reflecting surfaces thereof are not perpendicular to four sides of the liquid crystal display panel and are disposed such that the S-polarized component contained in a main component of light emitted from the light sources is reflected by the reflector. This keeps small the size of the liquid crystal display device and still improves reuse efficiency of the light emitted from the light sources.

16 Claims, 23 Drawing Sheets

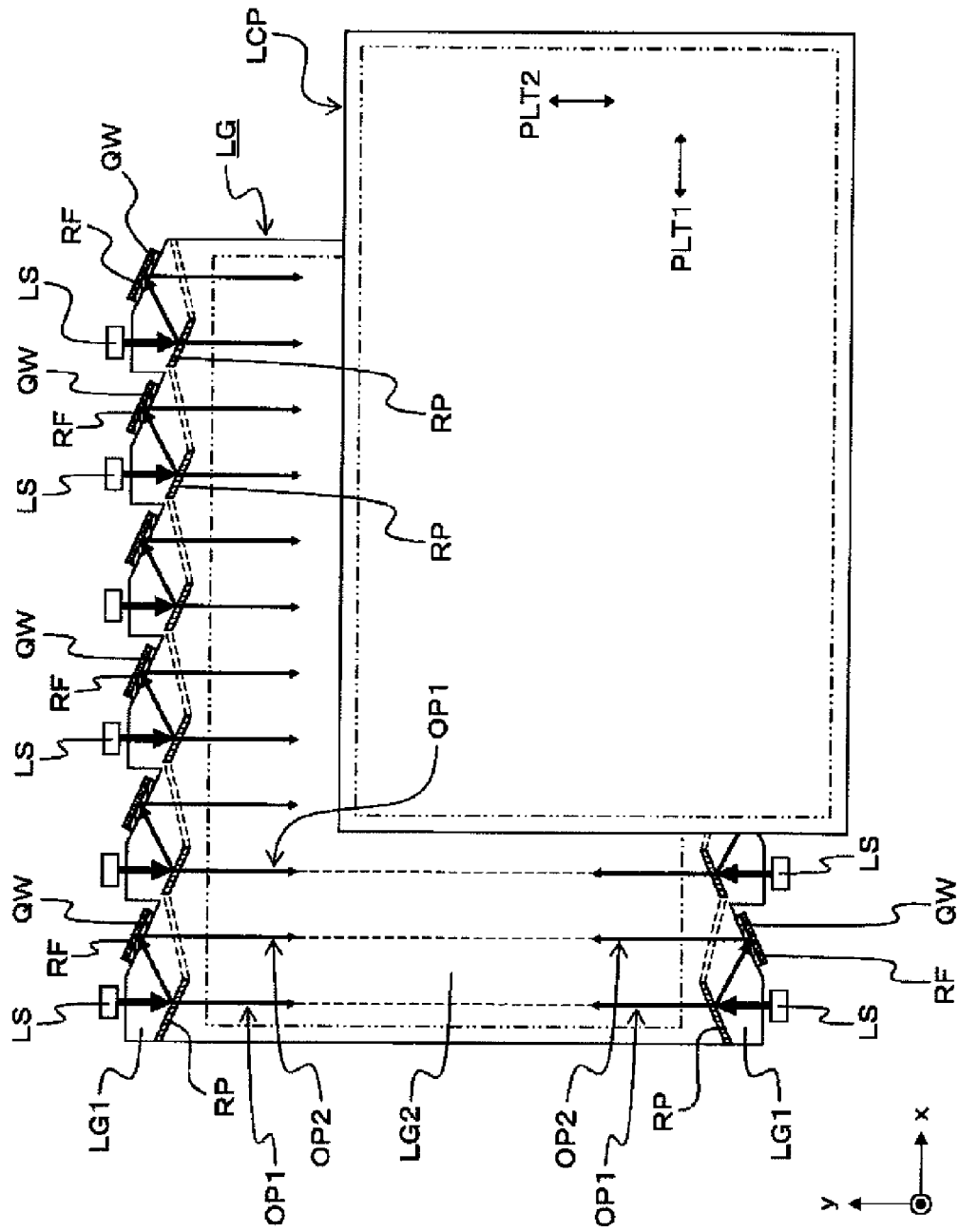

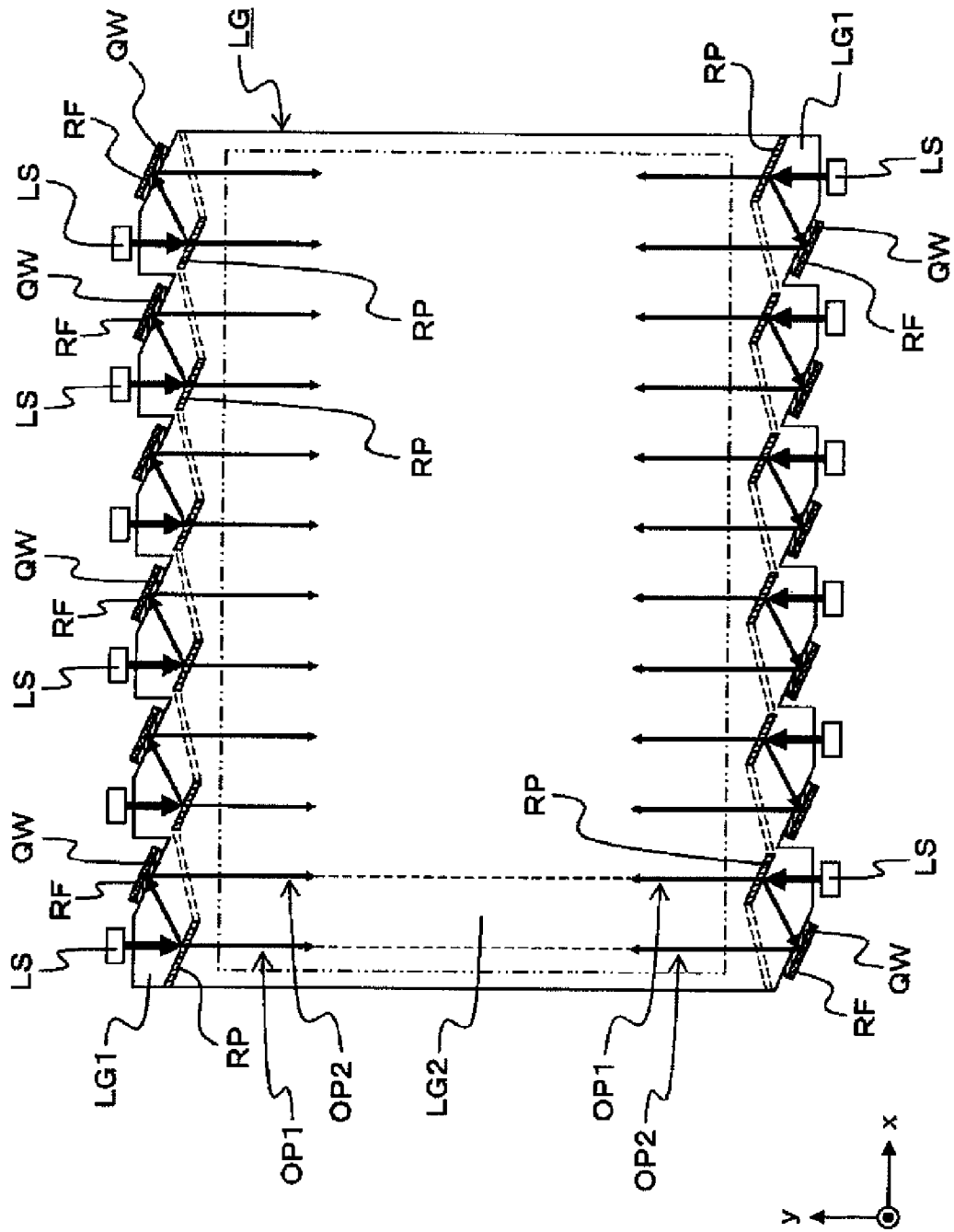

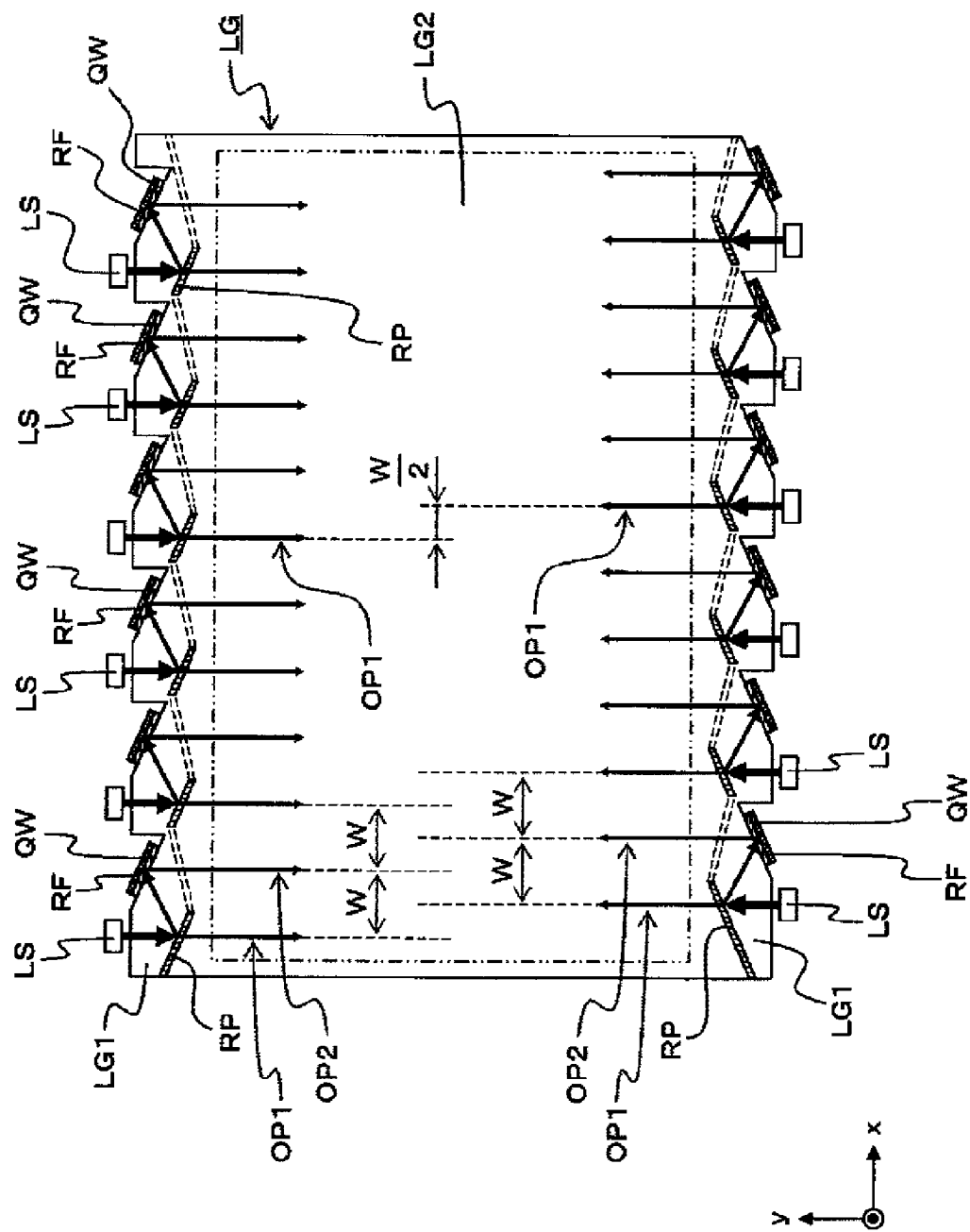

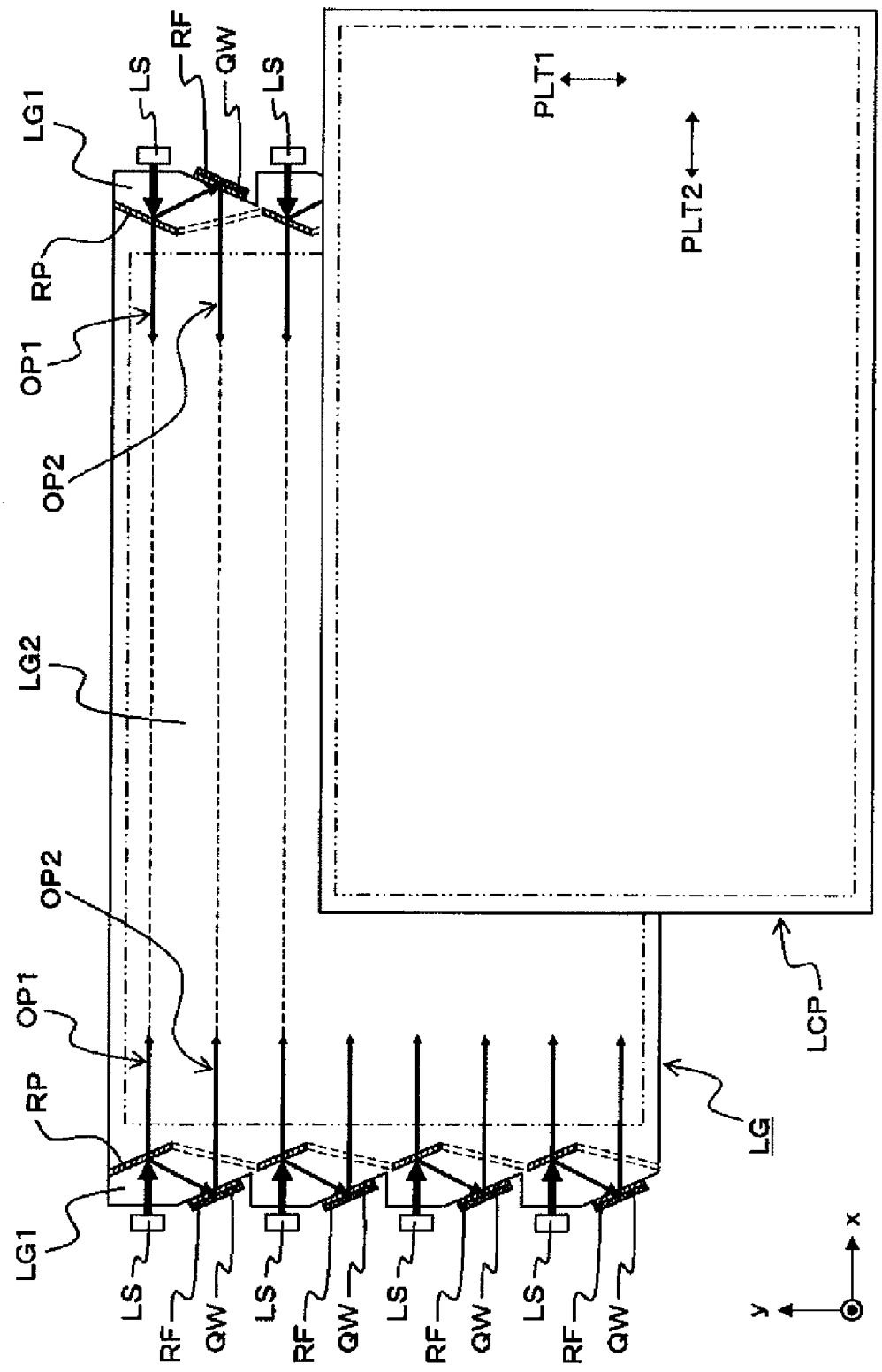

LIQUID CRYSTAL DISPLAY DEVICE

CROSS-REFERENCE TO RELATED APPLICATION

The present application claims priority from Japanese application JP 2009-061226 filed on Mar. 13, 2009, the content of which is hereby incorporated by reference into this application.

BACKGROUND OF THE INVENTION

1. Field of the Invention

The present invention relates to a liquid crystal display device. More particularly, the present invention relates to a technology, which is effective when applied to a liquid crystal display device with a backlight unit of a light guide plate system (also referred to as an edge light type or a side light type).

2. Description of the Related Art

Conventionally, a liquid crystal display device with a backlight unit of a light guide plate system is used as, for example, a display portion of portable information equipment such as a cellular telephone terminal.

There is a tendency for portable information equipment to handle, for example, more massive image information and video information which includes more frames as communication speed becomes higher and the capacity of an embedded memory is increased. In association with this, medium-sized and small-sized liquid crystal display devices used as a display portion of the portable information equipment have higher image quality and a larger screen, and further, tend to have more pixels. With regard to the number of the pixels, there is a transition to increase from a conventional quarter video graphics array (QVGA) of 240×320×3 pixels to a video graphics array (VGA) of 480×620×3 pixels.

Further, medium-sized and small-sized liquid crystal display devices used as the display portion of the portable information equipment is required to have, for example, longer battery life and higher brightness for improving outdoor visibility. Because the increase in the number of the pixels in the liquid crystal display devices ordinarily results in a decreased aperture ratio, especially with regard to a VGA liquid crystal display device, it is difficult to make the battery life longer and improve the brightness. Therefore, in recent years, to improve transmission efficiency of the liquid crystal display device is again considered.

The display principle of a liquid crystal display device is summarized as follows. A liquid crystal display device mainly includes a liquid crystal display panel and a backlight disposed at the back thereof. Here, the liquid crystal display panel includes a pair of substrates, a liquid crystal layer sandwiched between the pair of substrates, and a pair of polarizing plates disposed so as to sandwich the liquid crystal layer therebetween. Further, here, ordinarily, the pair of polarizing plates are disposed so as to sandwich the pair of substrates and the liquid crystal layer therebetween. A display region of the liquid crystal display panel includes a large number of pixels as described above, and each of the pixels includes a pixel electrode, a common electrode, and the liquid crystal layer.

Each of the pixels of the liquid crystal display panel produces black by blocking light from the backlight, and produces white by transmitting light from the backlight. The pair of polarizing plates are often disposed such that the absorption axes thereof are orthogonal to each other. In this case, if the polarization state of light which has passed through the polarizing plate on the backlight side is not changed by the liquid crystal layer, the light is completely absorbed by the other polarizing plate to produce black. Further, in this case, if the polarization state of light which has passed through the polarizing plate on the backlight side is changed by the liquid crystal layer, the light passes through the other polarizing plate to produce white.

Light from a backlight used in a liquid crystal display device is partially polarized light which is close to natural light, and hence ordinarily, almost 60% of the light is absorbed by the polarizing plate. This is one of the main reasons that the transmission efficiency is reduced in the liquid crystal display device.

In the conventional liquid crystal display device, in order to decrease absorption by a polarizing plate of light from a backlight, a reflective polarizing plate, for example, is used. The reflective polarizing plate is, for example, laminated on a surface of the polarizing plate which is in proximity to the backlight, and reflects a component of the light from the backlight which is absorbed by the polarizing plate to the backlight side. The light reflected by the reflective polarizing plate is reflected again by the light guide plate, a prism sheet, and the like of the backlight, and enters the reflective polarizing plate again. In the course of this process, if the light which enters the reflective polarizing plate again has a transmission component, the transmission component passes through the reflective polarizing plate and may be used for the display. If all the light reflected by the reflective polarizing plate enters the reflective polarizing plate again, and the ratio of the transmission component to the entire re-incident light is 100%, the light use efficiency must be approximately doubled. However, in a liquid crystal display device having the above-mentioned structure, the light use efficiency by using the reflective polarizing plate is increased only up to 1.3 times as the light use efficiency without using the reflective polarizing plate.

In order to still improve the light use efficiency, in a recent backlight including a light guide plate, a reflective polarizing plate is disposed in proximity to a light source as disclosed in, for example, Japanese Patent Application Laid-open No. 2003-007114.

SUMMARY OF THE INVENTION

In order that light reflected by a reflective polarizing plate is converted to a transmission component, depolarization caused by reflection and refraction at an interface of the light guide plate should not be used, but conversion should be carried out by using a polarizing converter. Further, here, light reflected by the reflective polarizing plate should be guided along an optical path which is set in advance and should be reflected toward the reflective polarizing plate with a high degree of efficiency. Basically, the light guide plate has the functions expanding the light emitted from a light source disposed at an end portion thereof so as to be planate, making uniform the intensity distribution of the light, and guiding the light to the liquid crystal layer side. Therefore, it is difficult to add to an ordinary light guide plate the function of reflecting the light reflected by the reflective polarizing plate to the liquid crystal layer side. If such a function is forced to be added, the efficiency is lowered with regard to each one of the functions.

In the liquid crystal display device disclosed in Japanese Patent Application Laid-open No. 2003-007114, a reflector and a ¼ wavelength plate are disposed in a layer in which the light source is disposed, and, further, the reflective polarizing plate is disposed between the light guide plate and the light source. Further, here, by disposing the reflector and the reflective polarizing plate so as not to be in contact with each other, i.e., with space therebetween, the ratio of light which enters the reflector and the ¼ wavelength plate with respect to light reflected by the reflective polarizing plate is made larger.

By the way, a light source used in a backlight including a light guide plate of a medium-sized or small-sized liquid crystal display device is ordinarily a light emitting diode (LED) characterized by being able to be driven at a low voltage and being small-sized. The light emitting diode is generally in the shape of a cube and a light emitting surface thereof is one surface of the cube. The light emission distribution is not isotropic. The light is particularly intense in the direction of a normal to the light emitting surface and the intensity is drastically decreased in a direction away from the normal.

The liquid crystal display device disclosed in Japanese Patent Application Laid-open No. 2003-007114 also uses a light emitting diode as the light source, but there is no specific description with regard to the arrangement in plan view of the reflector and the reflective polarizing plate. If the reflector and the reflective polarizing plate are disposed so as to be in parallel with four sides of the light guide plate, the most intense component of light emitted from the light emitting diode is, after being reflected by the reflective polarizing plate, not directed to the reflector and the ¼ wavelength plate but directed to the light emitting diode. Because the light emitting diode itself does not have the function of reflecting light and the function of converting the polarization state, light incident on the light emitting diode may not be reused. Therefore, a liquid crystal display device (backlight) having the structure as described in Japanese Patent Application Laid-open No. 2003-007114 has a problem that the most intense component of light emitted from the light source (light emitting diode) may not be reused.

It should be noted that, the reuse efficiency of light emitted from the light source in the above-mentioned structure may be improved even to some extent by, for example, making longer the distance between the reflector and the reflective polarizing plate, because this decreases the ratio of the component of emitted light which is reflected toward the light source. However, in this case, the size of the backlight is increased correspondingly to the increase of the distance between the reflector and the reflective polarizing plate, and as a result, another problem arises that the size of the liquid crystal display device is increased.

As described above, a liquid crystal display device with a backlight having a conventional light guide plate has a problem that it is very difficult to improve the reuse efficiency of light emitted from a light source, without increasing the small size of the liquid crystal display device.

An object of the present invention is to provide a technology which makes it possible to improve the reuse efficiency of light emitted from a light source, without increasing the small size of a liquid crystal display device with a backlight including a light guide plate.

The above-mentioned and other objects and novel features of the present invention are apparent from the description of the present specification and the attached drawings.

Representative aspects of the present invention disclosed in the present application is schematically described as follows.

(1) A liquid crystal display device, including: a liquid crystal display panel; a light guide plate disposed on a rear surface side of the liquid crystal display panel; and a plurality of light sources disposed at an end portion of the light guide plate, in which the plurality of light sources are disposed such that a direction of travel of light which is a main component in view of intensity distribution of light emitted from the plurality of light sources is substantially in parallel with respect to at least one of four sides of the liquid crystal display panel, the light guide plate includes: a reflective polarizing plate for transmitting a P-polarized component and reflecting an S-polarized component of the light emitted from the plurality of light sources, the reflective polarizing plate being between the end portion which the light emitted from the plurality of light sources enters and a light extraction portion at which light propagating in the light guide plate is extracted to a side of the liquid crystal display panel; a reflector for reflecting the S-polarized component of light reflected by the reflective polarizing plate; and a polarization converting member for converting the S-polarized component of light to a P-polarized component; the reflective polarizing plate and the reflector are tilted at an angle such that reflecting surfaces thereof are not perpendicular with respect to the direction of travel of the main component of light and are disposed such that the P-polarized component obtained by converting the S-polarized component of the main component of light with the polarization converting member is directed substantially in parallel with the direction of travel of the main component of light, and the polarization converting member is disposed at a location which is on a pathway of light reflected by the reflective polarizing plate but is not on a pathway of the main component of light which is before passing through the reflective polarizing plate.

(2) The liquid crystal display device according to Item (1), in which the polarization converting member includes a ¼ wavelength plate, and the ¼ wavelength plate is disposed at a location such that the light after a reflection of the reflective polarizing plate passes through the ¼ wavelength plate twice in a pathway that the light is reflected by the reflector and is directed to the light extraction portion.

(3) The liquid crystal display device according to Item (1), in which the polarization converting member includes a ¼ wavelength plate, and the ¼ wavelength plate and the reflector are laminated in the stated order from a side closer to the light guide plate, and the ¼ wavelength plate is disposed such that a slow axis thereof forms an angle of 45 degrees with respect to a thickness direction of the light guide plate.

(4) The liquid crystal display device according to Item (1), in which the reflective polarizing plate is disposed only at a location where the main component of light containing the P-polarized component and the S-polarized component passes through, and is not disposed at a location where which light reflected by the reflector passes through.

(5) The liquid crystal display device according to Item (1), in which the polarization converting member includes a ½ wavelength plate, the reflective polarizing plate is disposed only at a location where the main component of light containing the P-polarized component and the S-polarized component passes through, and the ½ wavelength plate is disposed at a location such that the light after being reflected by the reflective polarizing plate passes through the ½ wavelength plate once in a pathway that the light is reflected by the reflector and is directed to the light extraction portion and such that a slow axis thereof forms an angle of 45 degrees with respect to a thickness direction of the light guide plate.

(6) The liquid crystal display device according to Item (7), in which the reflective polarizing plate includes a laminate formed by alternately laminating an anisotropic medium having refractive index anisotropy and an isotropic medium not having the refractive index anisotropy, and the anisotropic medium is formed such that any one of an extraordinary refractive index and an ordinary refractive index in a layer plane of the laminate is equal to a refractive index of the isotropic medium.

(7) A liquid crystal display device, including: a liquid crystal display panel; a light guide plate disposed on a rear surface side of the liquid crystal display panel; and a plurality of light sources disposed at an end portion of the light guide plate, in which the plurality of light sources are disposed such that a direction of travel of light which is a main component in view of intensity distribution of light emitted from the plurality of light sources is substantially in parallel with respect to at least one of four sides of the liquid crystal display panel, the light guide plate includes: a reflective polarizing plate for separating the light emitted from the plurality of light sources into circularly polarized light of clockwise and circularly polarized light of counterclockwise and transmitting one circularly polarized light and reflects another circularly polarized light, the reflective polarizing plate being disposed between the end portion which the light emitted from the plurality of light sources enters and a light extraction portion at which light propagating in the light guide plate is extracted to a side of the liquid crystal display panel; a reflector for reflecting the another circularly polarized light reflected by the reflective polarizing plate; and a polarization converting member for converting the one circularly polarized light which passes through the reflective polarizing plate and the another circularly polarized light reflected by the reflector to a P-polarized component, and the reflective polarizing plate and the reflector are tilted at an angle such that reflecting surfaces thereof are not perpendicular with respect to the direction of travel of the main component of light and are disposed such that the P-polarized component obtained by converting the another circularly polarized light reflected by the reflective polarizing plate of the main component of light with the polarization converting member is directed substantially in parallel with the direction of travel of the main component of light.

(8) The liquid crystal display device according to Item (7), in which the reflective polarizing plate includes a laminate of cholesteric liquid crystal layers which exhibits characteristic reflection in wavelength range of the light emitted from the plurality of light sources, the polarization converting member includes a ¼ wavelength plate, and the ¼ wavelength plate is disposed such that a slow axis thereof forms an angle of 45 degrees with respect to a thickness direction of the light guide plate.

(9) The liquid crystal display device according to Item (7), in which the reflective polarizing plate includes a polymer liquid crystal layer having a twisted alignment, and the twisted alignment is formed such that a twist angle thereof is 90 degrees and a direction of alignment in a surface thereof in proximity to the plurality of light sources is either one of perpendicular to or in parallel with a thickness direction of the light guide plate.

(10) The liquid crystal display device according to Item (1) or Item (7), in which at least one of the reflective polarizing plate and the reflector is formed such that profile thereof in plan view of the plane which is opposed to the liquid crystal display panel is a curve which is concave with respect to incident light.

(11) The liquid crystal display device according to Item (1) or Item (7), in which the reflector includes a metal thin film having a high reflectivity.

(12) The liquid crystal display device according to Item (1) or Item (7), in which the light guide plate includes a combining portion light guide plate and a surface-emitting portion light guide plate, the combining portion light guide plate and the surface-emitting portion light guide plate have junction surfaces, respectively, which are opposed to each other and made to be in the same shapes, the plurality of light sources are disposed in proximity to an end portion of the combining portion light guide plate which is different from the junction surfaces, the reflective polarizing plate is formed on the junction surfaces of one of the combining portion light guide plate and the surface-emitting portion light guide plate, and the reflector is formed at the end portion of the combining portion light guide plate which is different from the junction surfaces.

(13) The liquid crystal display device according to Item (1) or Item (7), in which the liquid crystal display panel includes: a pair of substrates; a liquid crystal layer sandwiched between the pair of substrates; and a pair of polarizing plates disposed so as to sandwich the liquid crystal layer therebetween, and a polarizing plate of the pair of polarizing plates, which is disposed between the liquid crystal layer and the light guide plate, is made such that a direction of a transmission axis thereof is substantially in parallel with respect to the direction of travel of the main component of light in the light guide plate.

(14) The liquid crystal display device according to Item (13), in which the pair of polarizing plates are disposed so as to sandwich the pair of substrates and the liquid crystal layer.

(15) The liquid crystal display device according to Item (13), in which the liquid crystal display panel includes a pixel electrode and a common electrode on a surface of one substrate of the pair of substrates in proximity to the liquid crystal layer, the pixel electrode and the common electrode are formed in the same layer and have a comb-shaped structure, and the pixel electrode and the common electrode are formed such that a longitudinal direction of teeth portions of the comb-shaped structure of the pixel electrode and the common electrode is substantially in parallel with respect to the direction of travel of the main component of light.

(16) The liquid crystal display device according to Item (13), in which the liquid crystal display panel includes a pixel electrode and a common electrode on a surface of one substrate of the pair of substrates in proximity to the liquid crystal layer, the pixel electrode and the common electrode are laminated via an insulating layer and a closer electrode among the pixel electrode and the common electrode to the liquid crystal layer has a comb-shaped structure in plan view, and the comb-shaped structure is formed such that a longitudinal direction of teeth portions thereof is substantially in parallel with respect to the direction of travel of the main component of light.

According to the present invention, the use efficiency of light emitted from the light sources may be improved while the size of the liquid crystal display device is kept small. Therefore, by applying the present invention, for example, a liquid crystal display device the power consumption of which is the same as that of a conventional liquid crystal display device but the brightness of the display of which is higher, or a liquid crystal display device the brightness of the display of which is the same as that of a conventional liquid crystal display device but the power consumption of which is smaller may be obtained.

Therefore, by mounting a liquid crystal display device according to the present invention on a cellular telephone or the like, effects such as improvement of the visibility in a bright environment such as a bright outdoor environment and longer battery life may be obtained.

BRIEF DESCRIPTION OF THE DRAWINGS

In the accompanying drawings:

FIG. 22 is a schematic plan view illustrating a third example of the schematic structure of the main portion in the liquid crystal display device according to Embodiment 8;

FIG. 23 is a schematic plan view illustrating a fourth example of the schematic structure of the main portion in the liquid crystal display device according to Embodiment 8;

FIG. 24 is a schematic plan view illustrating a fifth example of the schematic structure of the main portion in the liquid crystal display device according to Embodiment 8; and FIG. 25 is a schematic plan view illustrating a sixth example of the schematic structure of the main portion in the liquid crystal display device according to Embodiment 8.

DETAILED DESCRIPTION OF THE INVENTION

Embodiments of the present invention are described in detail in the following with reference to the attached drawings.

It should be noted that, throughout the drawings for describing the embodiments, the components which have identical or similar functions are denoted by the same reference symbols, and the repetitive description thereof is omitted.

Embodiment 1

FIGS. 1 to 5 are schematic views for illustrating a schematic structure of a main portion of a liquid crystal display device according to Embodiment 1 of the present invention.

Figure 1:
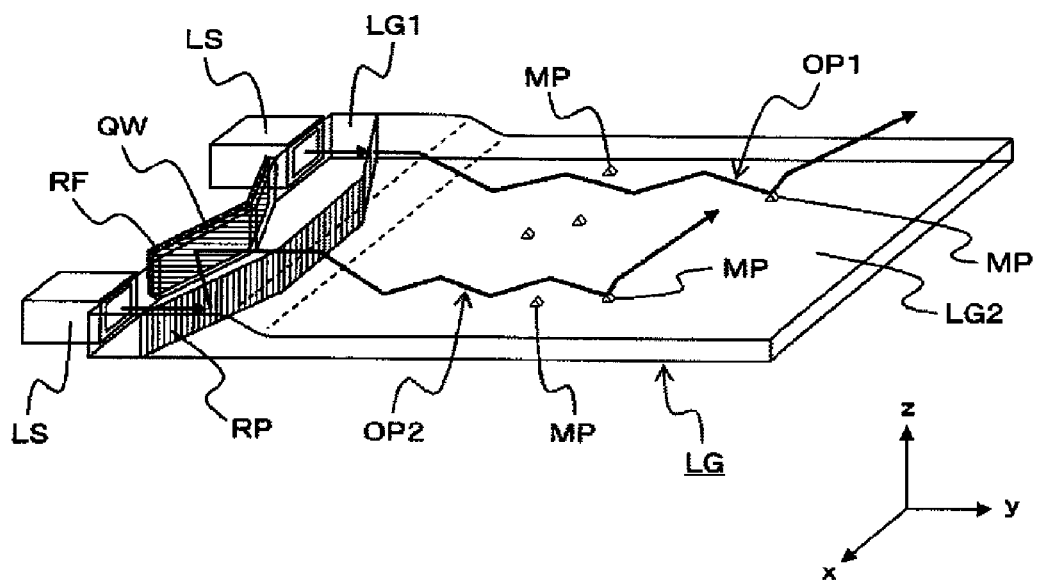
FIG. 1 is a schematic perspective view illustrating an exemplary schematic structure of a backlight in a liquid crystal display device according to Embodiment 1 of the present invention.
Figure 2:
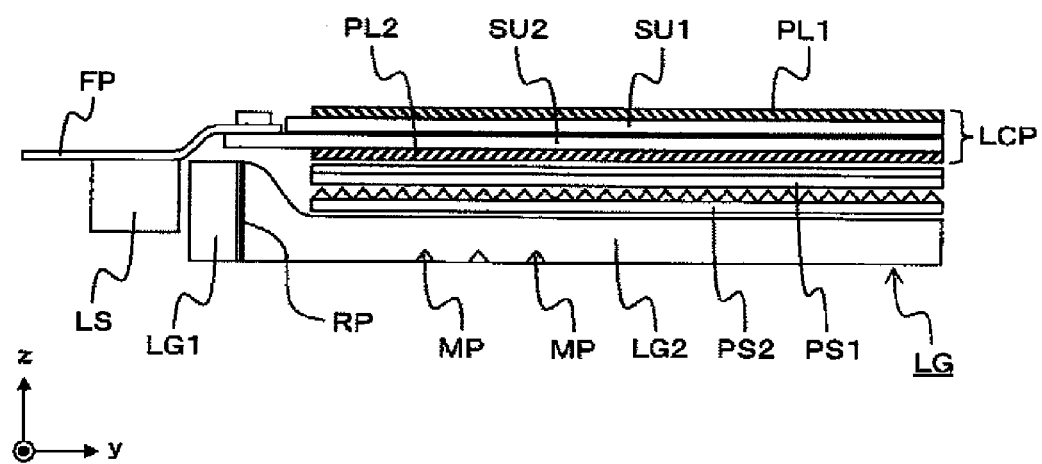
FIG. 2 is a schematic side view illustrating a schematic structure of a main portion of the liquid crystal display device according to Embodiment 1.
Figure 3:
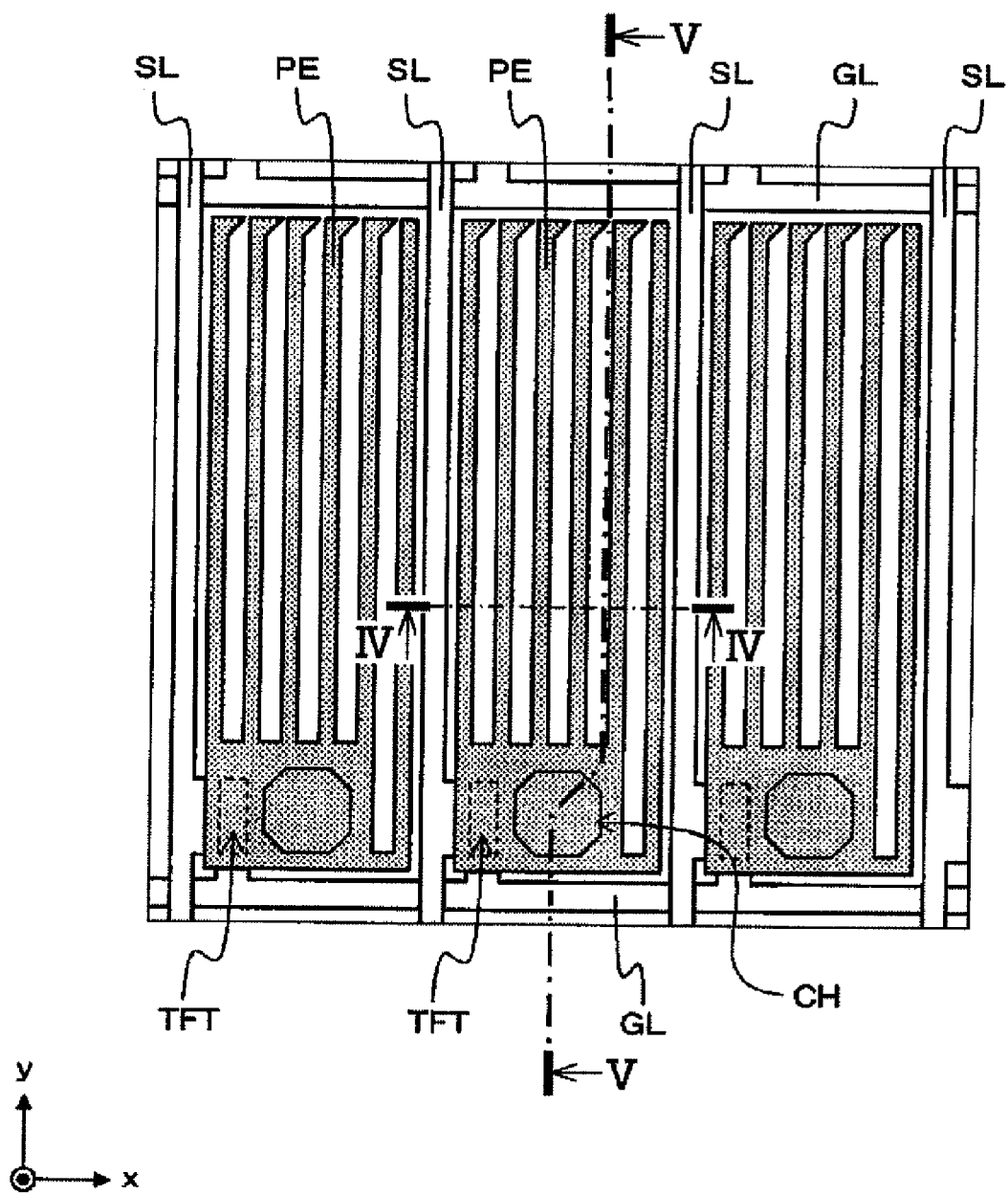
FIG. 3 is a schematic plan view illustrating a planar structure of a second substrate of a liquid crystal display panel.
Figure 4:
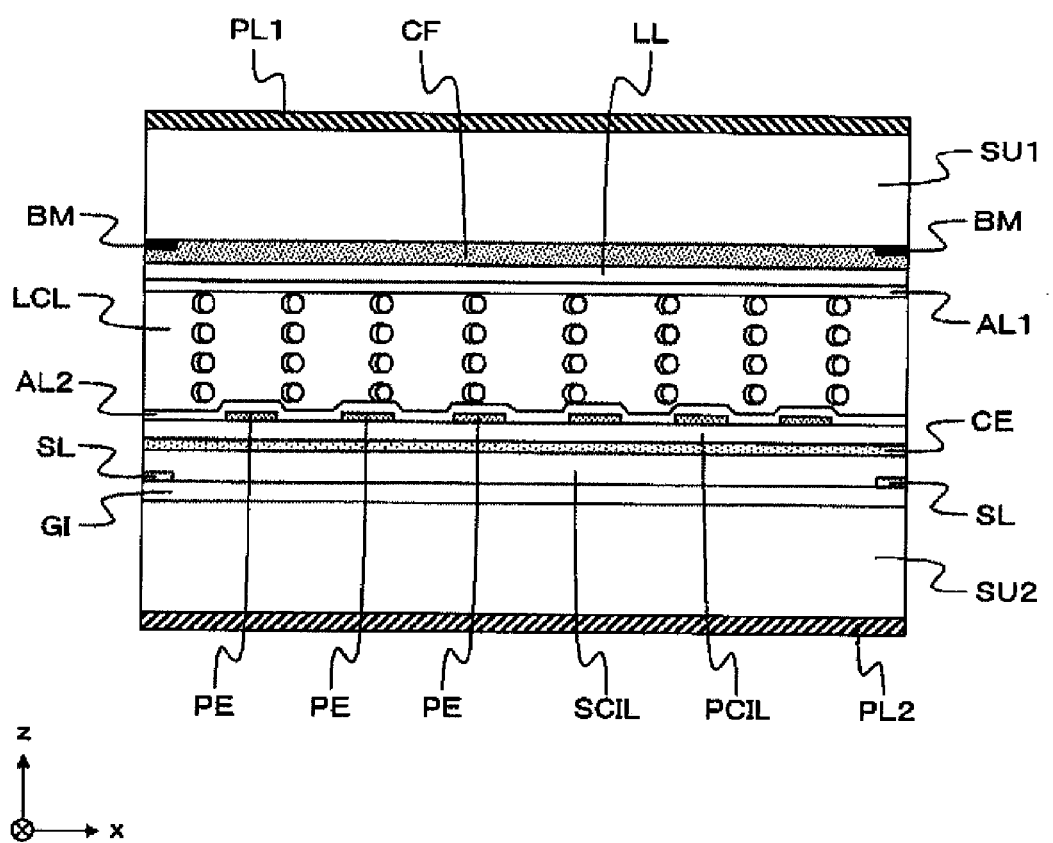
FIG. 4 is a schematic sectional view taken along the line A-A' of FIG. 3 illustrating a structure in section of the liquid crystal display panel.
Figure 5:
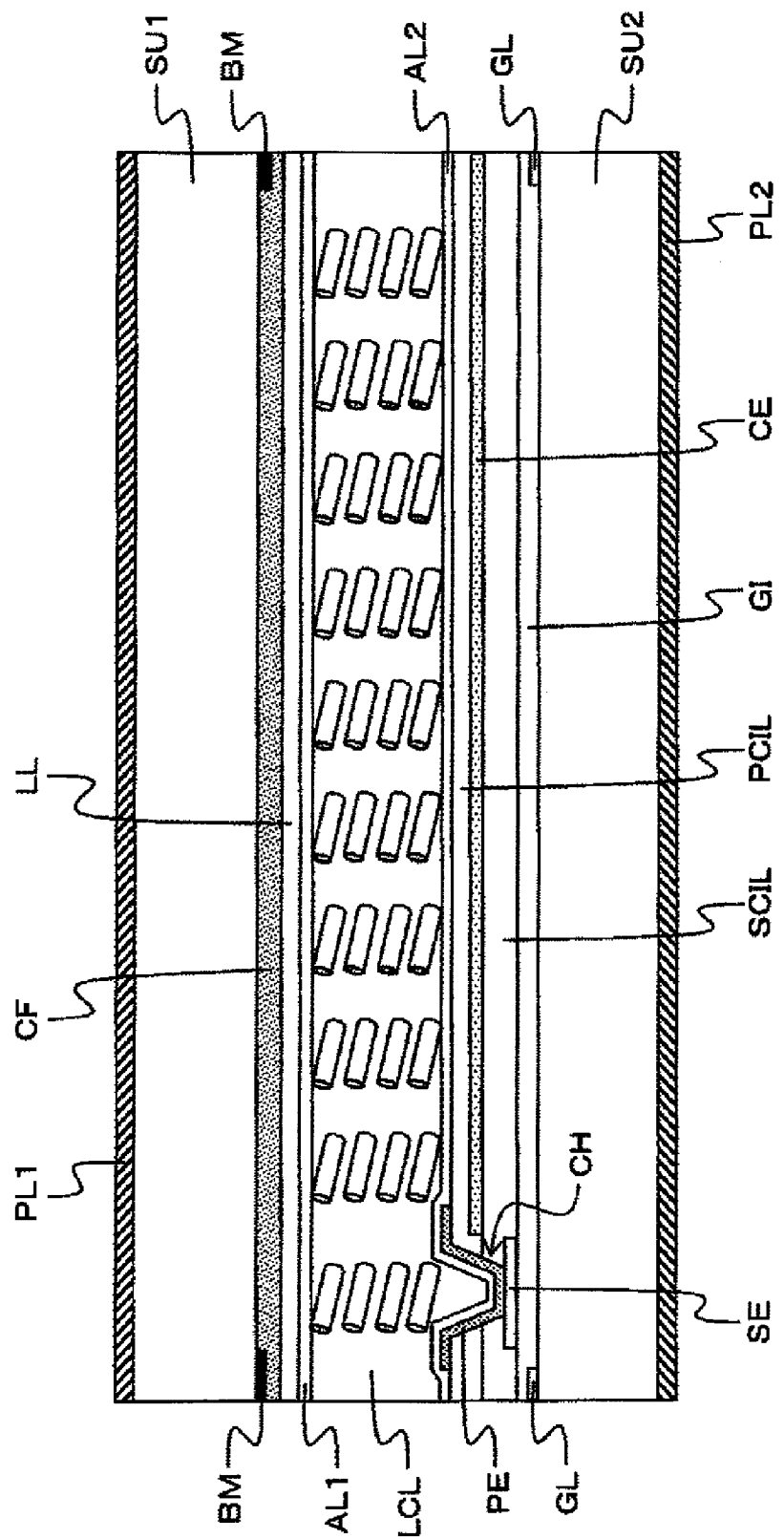
FIG. 5 is a schematic sectional view taken along the line B-B' of FIG. 3 illustrating a structure in section of the liquid crystal display panel.

FIG. 1 is a schematic perspective view illustrating an exemplary schematic structure of a backlight in the liquid crystal display device according to Embodiment 1 of the present invention. FIG. 2 is a schematic side view illustrating an exemplary schematic structure of the main portion of the liquid crystal display device according to Embodiment 1. FIG. 3 is a schematic plan view illustrating an exemplary planar structure of a second substrate of a liquid crystal display panel. FIG. 4 is a schematic sectional view illustrating an exemplary structure in section of the liquid crystal display panel taken along the line IV-IV of FIG. 3. FIG. 5 is a schematic sectional view illustrating an exemplary structure in section of the liquid crystal display panel taken along the line V-V of FIG. 3.

The liquid crystal display device according to Embodiment 1 has, for example, as illustrated in FIG. 1, a light guide plate LG which includes a combining portion light guide plate LG1 and a surface-emitting portion light guide plate LG2. Light sources LS are disposed at an end portion of the combining portion light guide plate LG1. The light sources LS include, for example, white light emitting diodes, and light emitted from the light sources LS travels such that a main component in the intensity distribution is in a long side direction of the light guide plate LG (in a y direction).

Further, a reflective polarizing plate RP is provided along a junction between the combining portion light guide plate LG1 and the surface-emitting portion light guide plate LG2. The reflective polarizing plate RP is disposed such that a portion which receives light from the light sources LS becomes diagonal to a perpendicular direction (x direction), rather than being perpendicular to a long side of the light guide plate LG. Further, there is a ¼ wavelength plate QW and a reflector RF at the end portion of the combining portion light guide plate LG1. The ¼ wavelength plate QW and the reflector RF are also disposed so as to be diagonal to the direction (the x direction) perpendicular to the long side of the light guide plate.

A large number of light extraction structures MP are formed at a bottom of the surface-emitting portion light guide plate LG2, some of which are illustrated in FIG. 1. The light extraction structures MP cause the light which propagates in the surface-emitting portion light guide plate LG2 to be emitted to the outside of the light guide plate LG. Here, the light extraction structures MP are, for example, as illustrated in FIG. 1, hollow and prism-like protrusions. The light extraction structures MP have their slant surfaces on the light sources LS side. Light reflected by the slant surfaces are emitted to the outside of the light guide plate LG. When attention is focused on light emitted from the light emitting surfaces of the light sources LS in the direction of the normal thereto (the main component of light in the intensity distribution), for example, the light guide plate LG has a first optical path OP1 and a second optical path OP2 formed therein. The first optical path OP1 passes through the reflective polarizing plate RP while the second optical path OP2 is reflected by the reflective polarizing plate RP, passes through the ¼ wavelength plate QW, is reflected by the reflector RF, and again passes through the ¼ wavelength plate QW. The backlight used in the liquid crystal display device according to the present invention is characterized by having the first optical path OP1 and the second optical path OP2 described above.

Further, Embodiment 1 assumes, a case in which the present invention is applied to a small-sized liquid crystal display device used as a display portion of a cellular telephone or the like, and hence two light sources LS are disposed at one end of the light guide plate LG (the combining portion light guide plate LG1). The light emission distribution of light emitted from the light sources LS (light emitting diodes) is anisotropic and has a relative maximum in the direction of the normal to the light emitting surfaces. Because the light emission distribution spreads, the distribution of light from the light sources LS becomes almost uniform in a portion in which the liquid crystal display panel overlies the surface-emitting portion light guide plate LG2. Further, the intensity of light which propagates in the light guide plate LG decreases as the distance from the light sources LS becomes larger. Therefore, the light extraction structures MP are disposed sparsely near the light sources LS where the intensity of light is high and are disposed densely away from the light sources LS where the intensity of light is low, to thereby uniformalize the intensity of light emitted to the outside of the light guide plate LG.

The structure of the light guide plate LG and change in the polarization state of light from the light sources LS in the liquid crystal display device according to Embodiment 1 are described in detail later.

In the liquid crystal display device according to Embodiment 1 with the backlight including the light guide plate as described above, for example, as illustrated in FIG. 2, a liquid crystal display panel LCP is disposed above the surface-emitting portion light guide plate LG2, and a first prism sheet PS1 and a second prism sheet PS2 are laminated in the stated order from the side nearer to the liquid crystal display panel LCP, between the surface-emitting portion light guide plate LG2 and the liquid crystal display panel LCP. The first prism sheet PS1 and the second prism sheet PS2 have the function of directing, to the direction (z direction) of the normal to the plane of the liquid crystal display panel LCP, light emitted from a surface of the light guide plate (surface-emitting portion light guide plate LG2) which is opposed to the liquid crystal display panel LCP. Each of the first prism sheet PS1 and the second prism sheet PS2 has protrusion structures on its surface opposed to the liquid crystal display panel LCP. The protrusion structures are in a shape of a triangular pyramid in section and the arrangement of which in plan view is in stripes. Here, the stripes formed by the protrusion structures in the first prism sheet PS1 are in parallel with the long side direction (the y direction) of the light guide plate while the stripes formed by the protrusion structures in the second prism sheet PS2 are in parallel with a short side direction (in the x direction) of the light guide plate.

It should be noted that, in the liquid crystal display device according to Embodiment 1, the number of prism sheets disposed between the light guide plate (the surface-emitting portion light guide plate LG2) and the liquid crystal display panel LCP may be reduced to one. When only one prism sheet is used, although the angle distribution of light from the light sources toward the liquid crystal display panel LCP is narrower, the thickness of the liquid crystal display device as a whole may be decreased. Further, the protrusion structures provided on the prism sheets may also be disposed on their surfaces opposed to the light guide plate. Still further, in addition to the prism sheets, a light diffuser and the like may also be laminated between the light guide plate (the surface-emitting portion light guide plate LG2) and the liquid crystal display panel LCP. By disposing the light diffuser, an effect of widening the angle distribution of light from the light sources toward the liquid crystal display panel LCP may be obtained.

The liquid crystal display panel LCP has a liquid crystal layer (not shown) between a first substrate SU1 and a second substrate SU2. The first substrate SU1, the liquid crystal layer, and the second substrate SU2 are sandwiched between a first polarizing plate PL1 and a second polarizing plate PL2.

The liquid crystal display panel LCP in the liquid crystal display device according to Embodiment 1 has, for example, a structure as illustrated in FIGS. 3 to 5. A black matrix BM, a color filter CF, a planarizing film LL, and a first alignment film AL1 are laminated in the stated order on a surface of the first substrate SU1 which faces to a liquid crystal layer LCL.

The first substrate SU1 is formed of, for example, a glass substrate made of borosilicate glass having a thickness of about 0.4 mm. The black matrix BM is a light shielding film which is formed by, for example, patterning a black resin film or a light shielding metal film. The color filter CF has, for example, three kinds of resists: a resist containing a pigment which exhibits red color; a resist containing a pigment which exhibits green color; and a resist containing a pigment which exhibits blue color. One pixel includes one of the above-mentioned three kinds of resists. Here, the color filter CF is disposed such that, for example, three consecutive pixels along the direction in which a scanning signal line GL extends (in the x direction) include a pixel having the resist containing the pigment which exhibits red color, a pixel having the resist containing the pigment which exhibits green color, and a pixel having the resist containing the pigment which exhibits blue color. The planarizing film LL is, for example, made of an acrylic resin, which is excellent in transparency, and has the functions of planarizing an uneven underlayer and preventing penetration of a solution therethrough. The first alignment film AL1 is, for example, an organic polymeric film of a polyimide, which has been subjected to alignment treatment by being rubbed, and includes a horizontal alignment film for giving a pretilt angle of about 1.5 degrees to adjacent liquid crystal molecules in the liquid crystal layer LCL.

Meanwhile, the second substrate SU2 includes, for example, a scanning signal line GL, a first insulating film GIL, a video signal line SL, a TFT (Thin Film Transistor) element, a second insulating film SCIL, a common electrode CE, a third insulating film PCIL, a pixel electrode PE, and a second alignment film AL2, which are laminated in the stated order on a surface of the second substrate SU2 which faces to the liquid crystal layer LCL.

The second substrate SU2 is formed of, similarly to the first substrate SU1, a glass substrate made of borosilicate glass. The second alignment film AL2 is a horizontal alignment film similar to the first alignment film AL1.

The scanning signal line GL, the video signal line SL, and a source electrode SE of the TFT element are, for example, wiring formed by etching a metal film such as aluminum. A gate electrode of the TFT element is formed so as to be integral with the scanning signal line GL. A drain electrode of the TFT element is formed so as to be integral with the video signal line SL. The pixel electrode PE and the common electrode CE are electrodes formed by etching a transparent conductive film such as Indium Tin Oxide (ITO), and both have a thickness of about 80 nm. Here, the common electrode CE is, for example, a strip-shaped electrode shared by a plurality of pixels arranged along the direction in which the scanning signal lime GL extends. The pixel electrode PE is connected to the source electrode SE via a contact hole CH. Further, here, the shape of the pixel electrode PE in plan view is comb-shaped as illustrated in FIG. 3, and in a triangular shape in plan view at each of the tips of the teeth of the comb has the function of preventing abnormal alignment from occurring when push pressure is applied from the outside.

The first insulating film GIL, the second insulating film SCIL, and the third insulating film PCIL are insulating films such as a silicon oxide film, a silicon nitride film, or a silicon oxynitride film. Here, the third insulating film PCIL interposed between the common electrode CE and the pixel electrode PE has a thickness of, for example, about 250 nm.

The liquid crystal layer LCL employs, a liquid crystal material which exhibits a nematic phase in a wide temperature range including room temperature, which has positive permittivity anisotropy, and which is of high resistance. Such a liquid crystal material is, due to its wide liquid crystal temperature range, applicable to mobile use in which the temperature in the environment of use changes widely. Further, because a liquid crystal material which has positive permittivity anisotropy is less viscous than a liquid crystal material which has negative permittivity anisotropy, the former may carry out display with speed response higher than that of the latter. Because the resistance is high, voltage drop during a retention period in which the TFT element is turned off is satisfactorily small, and hence the transmittance is maintained and flicker is prevented during the retention period.

The liquid crystal display panel LCP with pixels having the structure as illustrated in FIGS. 3 to 5 employs a so-called in-plane switching (IPS) system. When a potential difference is caused between the pixel electrode PE and the common electrode CE, arch-shaped electric line of force, which is called a fringe electric field, is formed between the pixel electrode PE and the common electrode CE. Here, the electric line of force passes through the liquid crystal layer LCL, and a lateral electric field having a component in parallel with a plane of the substrate is applied to the liquid crystal layer LCL. With this configuration, the direction of alignment of the liquid crystal is changed when voltage is applied thereto, so as to rotate mainly within the plane of the layer.

In the cases of a vertically aligned (VA) liquid crystal display panel, an electrically controlled birefringence (ECB) liquid crystal display panel or an optically compensated birefringence (OCB) liquid crystal display panel, in which an electric field is applied in a thickness direction (the z direction) of the liquid crystal layer LCL, the alignment change in the liquid crystal layer LCL when an electric field is applied thereto occurs mainly in terms of tilt angle of liquid crystal molecules. On the other hand, in an IPS liquid crystal display panel, change in the tilt angle is small. Therefore, in an IPS liquid crystal display panel, change in the effective value of retardation when an electric field is applied thereto is small, and hence display which is excellent in halftone reproductivity may be obtained in a wide range of viewing angle.

Further, in the case of the liquid crystal display panel LCP having the structure as illustrated in FIGS. 3 to 5, there are a large number of portions in which the pixel electrode PE overlies the common electrode CE. Because those portions are coupled in parallel to the liquid crystal layer LCL, those portions function as a transparent retention capacitor which retains at a fixed level the voltage applied to the liquid crystal layer LCL during a retention period. The capacitance of the transparent retention capacitor is in proportion to the area of the portions in which the pixel electrode PE overlies the common electrode CE, in proportion to the permittivity of the third insulating film PCIL, and in inverse proportion to the thickness of the third insulating film PCIL. When the capacitance of the transparent retention capacitor is satisfactory, phenomena which result in lower visibility such as flicker and a brightness gradient are not caused.

The gap (space) between the first substrate SU1 and the second substrate SU2 is kept uniform by, for example, columnar spacers (not shown) disposed on the first substrate SU1 side. The columnar spacers are, for example, a trapezoid rotator (circular truncated cone) and the diameter of the base is about 10 μm. A liquid crystal material is vacuum-encapsulated in the gap between the first substrate SU1 and the second substrate SU2, and the above-mentioned liquid crystal layer LCL is formed. The liquid crystal layer LCL is aligned homogenously, and the direction of alignment is set to form an angle of 5 degrees with the scanning signal line GL, the reason for which is described later. Here, the direction of the electric field and the direction of alignment form an angle of 85 degrees when voltage is applied, which is large enough, and hence the direction of alignment of the liquid crystal satisfactorily rotates when voltage is applied thereto, to thereby attain high transmittance.

Further, each of the first polarizing plate PL1 and the second polarizing plate PL2 contains an iodine-based coloring agent which has been processed for alignment, and their dichroism converts natural light to polarized light. With regard to the first polarizing plate PL1 and the second polarizing plate PL2, the direction in which the maximum absorptance of incident light is referred to as absorption axis, and the direction in which the minimum absorptance of incident light is referred to as transmission axis, and, polarized components which are in parallel with the absorption axis and in parallel with the transmission axis are referred to as absorption component and transmission component, respectively. The first polarizing plate PL1 and the second polarizing plate PL2 are disposed such that, when viewed from the direction of the normal to the plane thereof, their absorption axes of the first polarizing plate PL1 and the second polarizing plate PL2 are orthogonal to each other and the absorption axis of the second polarizing plate PL2 is in parallel with the alignment direction of the liquid crystal when no electric field is applied thereto. By disposing the first polarizing plate PL1 and the second polarizing plate PL2 in this way, black is produced when no voltage is applied thereto.

It should be noted that the liquid crystal display panel LCP in the liquid crystal display device according to Embodiment 1 is not limited to the one having the structure as illustrated in FIGS. 3 to 5, and any of various liquid crystal display panels used in conventional transmissive and transflective liquid crystal display devices may be used.

Figure 6:
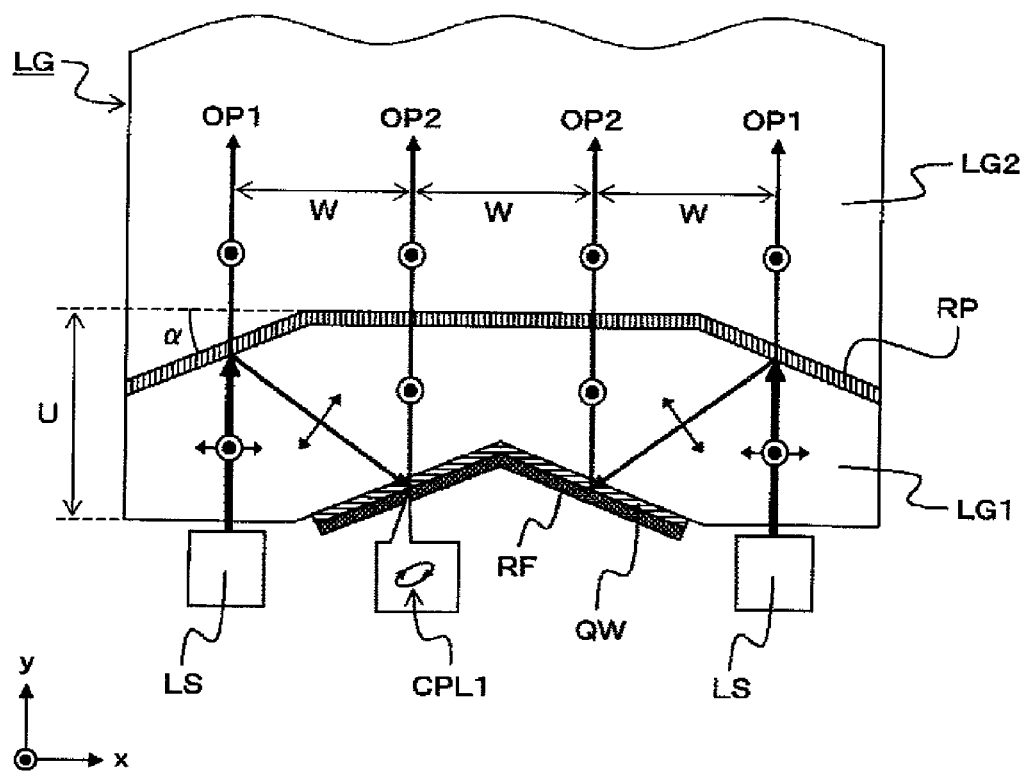
FIG. 6 is a schematic plan view illustrating a planar structure of a main portion of the backlight, which illustrates the changes in a polarization state of light in the liquid crystal display device according to Embodiment 1.

FIG. 6 is a schematic plan view illustrating an example of a planar structure of a main portion of the backlight, which illustrates the changes in the polarization state of light in the liquid crystal display device according to Embodiment 1.

Light is a kind of electromagnetic wave. When interaction between light and a polarizing plate in a liquid crystal display device is considered, attention is focused on an electric vector of light. The electric vector exists in a plane perpendicular to the direction of travel of light (to the direction perpendicular to an equiphase plane). When light emitted from a backlight of a liquid crystal display device and the use efficiency thereof are considered, light should be regarded as a mixture of light with different electric vector vibration directions. In this case, two extreme states of light are assumed: completely polarized light in which the electric vector vibration direction is completely the same; and natural light in which all vibration directions of light are uniformly mixed. However, generally, light is in a state between the completely polarized light and the natural light, and the light is this state referred to as partially polarized light, that is, a state in which different vibration directions of light are nonuniformly mixed. For example, light which passes through a polarizing plate used in a liquid crystal display device is not completely polarized light but partially polarized light which is close to completely polarized light mainly formed of a transmission component. Such partially polarized light is often referred to simply as polarized light, and hence light which passes through a polarizing plate is herein also referred to as polarized light.

The light guide plate in the liquid crystal display device according to Embodiment 1 includes the combining portion light guide plate LG1 and the surface-emitting portion light guide plate LG2, and the reflective polarizing plate RP is disposed along the junction between the light guide plates LG1 and LG2.

The reflective polarizing plate RP has a structure where two kinds of polymeric films whose thicknesses equal to one-half of the wavelength of visible light passing therethrough are alternately laminated. It should be noted that one of the two kinds of polymeric films is a polymeric film which has in-plane refractive-index anisotropy and the other is a polymeric film which does not have refractive index anisotropy. Further, an extraordinary light refractive-index ne or an ordinary light refractive-index no of the polymeric film which has refractive-index anisotropy is equal to the refractive-index of the polymeric film which does not have refractive-index anisotropy. Here, suppose that the ordinary light refractive-index no is equal to the refractive index of the polymeric film which does not have refractive index anisotropy. Polarized light the vibration direction of which is in parallel with the ordinary light refractive-index no always has a fixed refractive index in the reflective polarizing plate RP, and hence the polarized component passes through the reflective polarizing plate RP. Polarized light the vibration direction of which is in parallel with the extraordinary light refractive-index ne has a refractive index which varies in the same cycle as the cycle of the wavelength in the reflective polarizing plate RP, and hence the polarized component is reflected by the reflective polarizing plate RP. In this way, one of the two polarized components the vibration directions of which are orthogonal to each other passes through the reflective polarizing plate RP and the other is reflected by the reflective polarizing plate RP.

As the reflective polarizing plate RP, for example, a wire grid polarizing plate may also be used. A wire grid polarizing plate is a metal thin film patterned in stripes, and a polarized component having the vibration direction which is the same direction of the stripes is reflected by the wire grid polarization plate and a polarized component having the vibration direction which is perpendicular to the direction of the stripes passes through the wire grid polarization plate. Here, the pitch of the stripes is smaller than the wavelengths of the visible region. In a case of using the wire grid polarizing plate as the reflective polarizing plate RP, the plate may be such that the disposed stripes are in parallel with the plane of the light guide plate, to thereby cause a P-polarized component to pass through the wire grid polarizing plate and an S-polarized component to be reflected by the wire grid polarizing plate. The wire grid polarizing plate may be, for example, directly formed on a cross section (junction surface) of the surface-emitting portion light guide plate LG2, or may be formed on a transparent resin film and then adhered to the cross section of the surface-emitting portion light guide plate LG2.

The most intense component of light emitted from the light sources LS, in other words, the main component emitted in the direction of the normal to the light emitting surfaces (in the y direction) propagates, for example, as illustrated in FIG. 6, in the combining portion light guide plate LG1 to enter the reflective polarizing plate RP. Here, light emitted from the light sources LS is so-called natural light, and hence light which propagates in the combining portion light guide plate LG1 contains both a P-polarized component and an S-polarized component. When such light containing both a P-polarized component and an S-polarized component enters the reflective polarizing plate RP, the P-polarized component passes therethrough the reflective polarizing plate RP while the S-polarized component is reflected thereon. The P-polarized component which has passed through the reflective polarizing plate RP propagates along the first optical path OP1 in the surface-emitting portion light guide plate LG2 to be reflected by the slant surfaces of the light extraction structures MP, and is emitted to the liquid crystal display panel LCP side.

It should be noted that a P-polarized component is a polarized component having the vibration direction in a plane formed by a normal line (z axis) to an air interface of the light guide plate and light ray which enters the air interface when light which propagates in the light guide plate is extracted to the outside of the light guide plate. An S-polarized component is a polarized component which is perpendicular to the P-polarized component. An S-polarized component includes a vibration component which is in parallel with the plane of the light guide plate, and a P-polarized component includes a vibration component which is perpendicular to the plane of the light guide plate.

Here, a portion of the reflective polarizing plate RP, where the light from the light sources LS enters, tilts, as illustrated in FIG. 6, at an angle α with respect to the direction (x direction) perpendicular to the long side direction of the light guide plate (the surface-emitting portion light guide plate LG2). Therefore, the S-polarized component reflected by the reflective polarizing plate RP is not directed to the light source LS which emits the light but directed to the ¼ wavelength plate QW which is disposed between the two light sources LS. On the course of passing through the ¼ wavelength plate QW, the S-polarized component is circularly polarized (clockwise circularly polarized light CPL1) and enters the reflector RF.

After being reflected by the reflector RF, the clockwise circularly polarized light CPL1 again passes through the ¼ wavelength plate QW. In the course of passing through the ¼ wavelength plate QW, the clockwise circularly polarized light CPL1 is converted to a P-polarized component. Light which is converted to a P-polarized component by the ¼ wavelength plate QW and the reflector RF passes through the reflective polarizing plate RP, propagates along the second optical path OP2 in the surface-emitting portion light guide plate LG2, and is reflected by the slant surfaces of the light extraction structures MP to be emitted to the liquid crystal display panel LCP side.

The ¼ wavelength plate QW employs a cycloolefin organic polymer. The cycloolefin organic polymer has only a small ratio of double bonds, and hence does not absorb light in the near-ultraviolet region. Therefore, a ¼ wavelength plate QW using a cycloolefin organic polymer has an advantage in high transparency in the visible light region and excellent weather resistance, and hence the ¼ wavelength plate is less susceptible to deterioration even when it is disposed in proximity to a high-intensity light source LS (light emitting diode) and irradiated with light therefrom. Further, the reflector RF employs a polymeric film as a base having an aluminum film formed on a surface thereof.

As illustrated in FIG. 6, the ¼ wavelength plate QW and the reflector RF are disposed so as to be substantially in parallel with the tilt portion of the reflective polarizing plate RP such that the direction of travel of the converted P-polarized component (second optical path OP2) is substantially in parallel with the direction of travel of a P-polarized component in the direction of the normal of light emitted by the light sources LS (first optical path OP1), that is, the long side direction of the light guide plate LG (y direction).

Further, here, the angle α of the reflective polarizing plate RP and a distance U from an end portion of the combining portion light guide plate LG1 to the farthest portion of the reflective polarizing plate RP are preferably set such that the interval between the first optical path OP1 and the second optical path OP2 of light emitted from one of the light sources LS and the interval between the first optical path OP1 and the second optical path OP2 of light emitted from the other of the light sources LS are the same intervals W.

As described above, in the liquid crystal display device according to Embodiment 1, the reflective polarizing plate RP is disposed as being titled, and hence, of the main component of light emitted from the light emitting surface of the light source LS to the direction of the normal to the light emitting surfaces, a component which is reflected by the reflective polarizing plate RP does not return to the light source LS and is directed toward the ¼ wavelength plate QW and the reflector RF which are disposed in proximity to the light sources LS. Therefore, in the liquid crystal display device according to Embodiment 1, an S-polarized component of the most intense component of light (main component of light) emitted from the light sources LS may be converted to a P-polarized component. Further, in the liquid crystal display device according to Embodiment 1, the ¼ wavelength plate QW and the reflector RF also tilt with respect to the short side direction (x direction) of the light guide plate LG and are in parallel with the reflective polarizing plate RP. Therefore, light reflected on the ¼ wavelength plate QW and the reflector RF is directed so as to be again in parallel with a long side of the light guide plate LG. The direction of travel of the P-polarized component which passes through the reflective polarizing plate RP (first optical path OP1) and the direction of travel of the converted P-polarized component (second optical path OP2) are in parallel with each other, and hence the P-polarized component which propagates in the surface-emitting portion light guide plate LG2 is almost uniformly distributed.

Further, when light which propagates in the surface-emitting portion light guide plate LG2 is reflected by the light extraction structures MP and is emitted to the outside of the light guide plate LG, a P-polarized component is more likely to be emitted than an S-polarized component. Because the reflectivity of a P-polarized component at an interface between the light guide plate LG and air is low, a P-polarized component is likely to be emitted to the outside of the light guide plate LG. On the other hand, because the reflectivity of an S-polarized component at an interface between the light guide plate LG and air is high, most of an S-polarized component returns into the light guide plate LG, and hence an S-polarized component is not likely to be emitted to the outside of the light guide plate LG. For the above reason, in order to enhance the use efficiency of light emitted from the light sources LS, light emitted from the light sources LS is converted to a P-polarized component the vibration direction of which is in parallel with a width direction of the light guide plate LG.

In the backlight according to Embodiment 1, in the above-mentioned way, an S-polarized component of light emitted from the light sources LS is converted to a P-polarized component, to thereby improve the use efficiency of light.

When attention is focused on change in the polarization state in the light guide plate (surface-emitting portion light guide plate LG2), as illustrated in FIG. 1, light which propagates in the light guide plate is repeatedly reflected at an interface of the light guide plate before entering the light extraction structures MP, and is reflected by the light extraction structures MP to be directed to the outside of the light guide plate LG. Light which is emitted to the outside of the light guide plate LG is refracted by the second prism sheet PS2 and the first prism sheet PS1 illustrated in FIG. 2 to be directed to the direction of the normal to the liquid crystal display panel LCP (to the z direction). Here, as long as the direction of travel of light in the light guide plate is in parallel with a long side of the light guide plate LG and the optical axis thereof is in the direction of the long side, only a P-polarized component is generated by any one of the reflections and refractions, and an S-polarized component is not generated, regardless of whether the light guide plate LG is isotropic or anisotropic. Therefore, the direction of vibration of light which passes through the prism sheets PS2 and PS1 to be directed to the direction of the normal to the liquid crystal display panel LCP is in parallel with the long side direction of the liquid crystal display panel LCP.

Accordingly, when the transmission axis of the second polarizing plate PL2 of the liquid crystal display panel LCP which is combined with the above-mentioned backlight is set to be in parallel with the long side direction of the liquid crystal display panel LCP or set to form an angle close to be in parallel with the long side direction of the liquid crystal display panel LCP, light from the backlight passes through the second polarizing plate PL2 with an extremely high degree of efficiency.

The video signal line SL and the scanning signal line GL are usually disposed so as to be in parallel with a long side or a short side of the liquid crystal display panel LCP, and hence the individual pixel is in a rectangular shape. When write time per pixel is required to be longer, the number of the scanning signal lines GL is decreased, and hence the direction in which the scanning signal line GL extends is in parallel with the long side direction of the liquid crystal display panel LCP. The number of the video signal lines SL is three times larger than that of the scanning signal lines GL in order to accommodate three colors of subpixels, namely red (R), green (G), and blue (B). As a result, a long side of each pixel is set to be in parallel with a short side of the liquid crystal display panel LCP. When the liquid crystal display panel LCP employs an IPS system as described in Embodiment 1, when a longitudinal direction of the teeth portions of the pixel electrode PE (comb electrode) may be set to be in parallel with a long side or a short side of the liquid crystal display panel LCP, an ineffective region in which a fringe field is not distributed in a pixel may be reduced.

Further, when the direction of alignment of the liquid crystal layer LCL tilts 5 degrees with respect to the direction of the comb electrode as described above, the angle formed by the transmission axis of the second polarizing plate PL2 and a long side or a short side of the liquid crystal display panel LCP is also set to 5 degrees. Here, the direction of vibration of light from the backlight is, as described above, in parallel with the long side direction of the liquid crystal display panel LCP, and hence the direction of vibration of light from the backlight is not completely in parallel therewith, but deviated 5 degrees with respect to the transmission axis of the second polarizing plate PL2. However, if the deviation is such a small degree, light from the backlight may pass through the second polarizing plate PL2 with a sufficiently high degree of efficiency. The reason is as follows. Suppose that light from the backlight is completely polarized and linearly polarized and the second polarizing plate PL2 is a complete polarizing plate, the efficiency at which light from the backlight passes through the second polarizing plate PL2 is in proportion to $\cos^2 \theta$ where $\theta$ is an angle formed by the direction of vibration of light from the backlight and the transmission axis of the second polarizing plate PL2. Decrease in transmission efficiency when $\theta=5°$ is about 1%, as compared with an ideal case in which $\theta=0°$. Therefore, even if the polarization state of light which enters the second polarizing plate PL2 from the backlight is not linearly polarized light which is completely in parallel with the transmission axis thereof but deviated about 5 degrees with respect to the transmission axis thereof, a satisfactory effect of improving the transmittance may be obtained. It should be noted that a complete polarizing plate is an ideal polarizing plate the transmittances of which with regard to an absorption component and a transmission component are 0% and 100%, respectively.

Further, both of the combining portion light guide plate LG1 and the surface-emitting portion light guide plate LG2 are made of a transparent resin such as an acrylic resin, and usually formed by injection molding. Here, the direction of flow of the transparent resin in injection molding is adapted to be mainly in the long side direction of the light guide plate, with the result that the direction of travel of light from the light sources LS is in parallel with the direction of flow of the transparent resin. More specifically, a large number of inlets for receiving the transparent resin are provided in portions corresponding to short sides of the light guide plate. The transparent resin radially spreads with the inlets being the centers of the spread. However, when adjacent inlets are sufficiently close to each other, the transparent resin masses from adjacent inlets collide with each other and the flow is directed in the long side direction of the light guide plate. When injection molding is used, for example, by solidification with polymer chains forming the transparent resin being directed in the direction of flow, double refraction may be generated in the light guide plate. However, insofar as the direction of flow is the long side direction of the light guide plate, light from the light sources LS propagates so as to be in parallel with a slow axis of the light guide plate, and hence the polarization state of light from the light sources LS does not change by the double refraction of the light guide plate. Therefore, the polarization state of a P-polarized component, which has passed through the reflective polarizing plate RP, is satisfactory maintained during propagating in the surface-emitting portion light guide plate LG2 until being extracted to the outside of the light guide plate LG.

The proximity surfaces (surfaces which are opposed to each other) of the combining portion light guide plate LG1 and the surface-emitting portion light guide plate LG2 are made to be in the same shapes and are integrally formed with the reflective polarizing plate RP sandwiched therebetween. The combining portion light guide plate LG1 has flat surfaces and slant surfaces on the light sources LS (for example, white light emitting diodes) side, and the light sources LS are disposed so as to be in proximity to the flat surfaces. The ¼ wavelength plate QW and the reflector RF are laminated on the slant surfaces in the stated order from a side in proximity to the combining portion light guide plate LG1. As illustrated in FIG. 2, the light sources LS are fixed on a flexible substrate FP, and the surface-emitting portion light guide plate LG2, the combining portion light guide plate LG1, and the flexible substrate FP are integrated into one unit by a frame (not shown).

Further, as illustrated in FIG. 2, in the liquid crystal display device according to Embodiment 1, the thickness of the light guide plate (surface-emitting portion light guide plate LG2) is reduced at the portion in which the liquid crystal display panel LCP overlies the surface-emitting portion light guide plate LG2, is increased at a portion which is in proximity to the light sources LS, and is continuously changed at a portion therebetween, which is for the purpose of reducing the thickness of the liquid crystal display device. The thickness is continuously changed in the surface-emitting portion light guide plate LG2. The thickness is fixed at the junction between the combining portion light guide plate LG1 and the surface-emitting portion light guide plate LG2, and is equal to the thickness of the portion of the combining portion light guide plate LG1 which is in proximity to the light sources LS. The junction between the combining portion light guide plate LG1 and the surface-emitting portion light guide plate LG2 is increased in thickness so that the combining portion light guide plate LG1 and the surface-emitting portion light guide plate LG2 may be stably held. Further, with regard to light which is reflected by the reflective polarizing plate RP, the ratio of light directly enters the ¼ wavelength plate QW and the reflector RF, without being reflected by an upper surface or a lower surface of the light guide plate, increases. Accordingly, with the light guide plate LG formed in the shape as described above, the efficiency of polarization conversion may be increased.

As described above, in the liquid crystal display device according to Embodiment 1, an S-polarized component of light emitted from the light sources LS is converted to a P-polarized component and the transmission axis of the second polarizing plate PL2 is set so as to be in substantially parallel with the direction of vibration thereof, to thereby allow light from the backlight to pass through the second polarizing plate PL2 with high degree of efficiency. As a result, the liquid crystal display device according to Embodiment 1 is capable of performing, for example, display in higher brightness with the same power consumption.

Comparative Example 1

Figure 7:
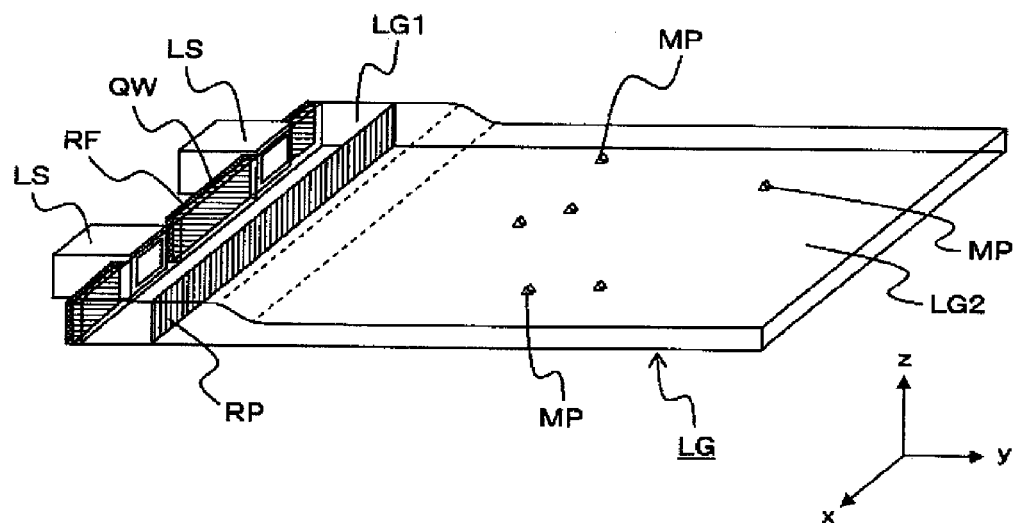
FIG. 7 is a schematic perspective view illustrating a schematic structure of a main portion of a backlight of Comparative Example 1.
Figure 8:
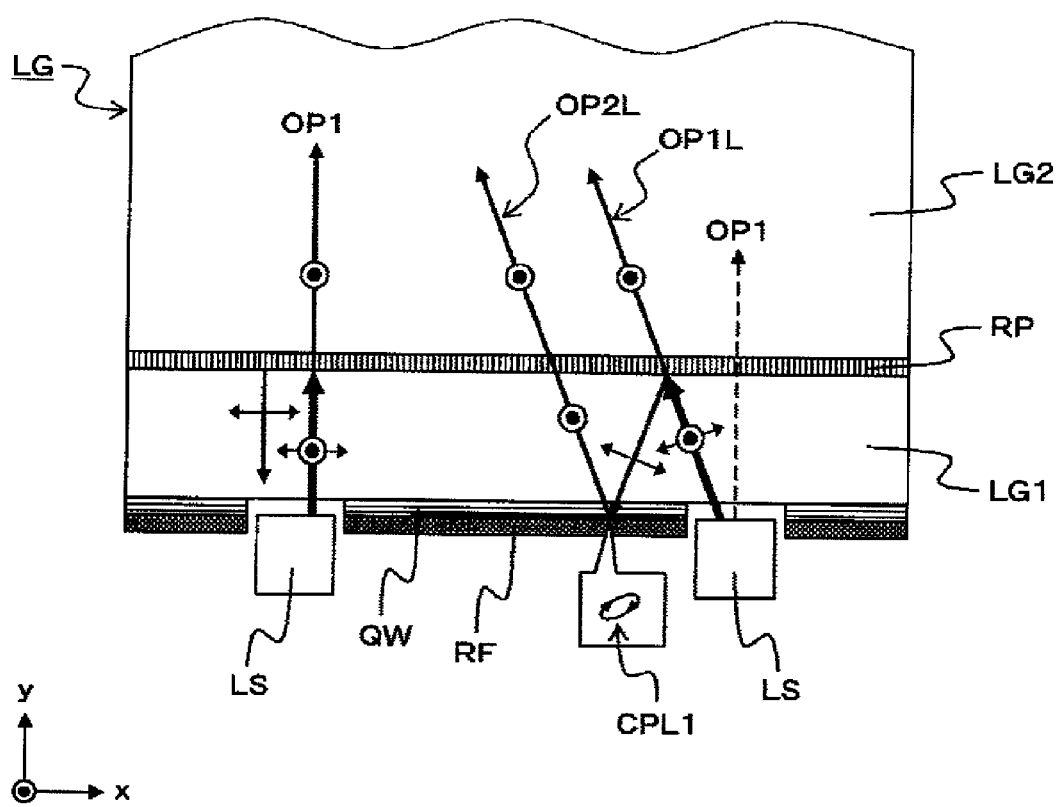
FIG. 8 is a schematic plan view illustrating change in a polarization state of light in the backlight of Comparative Example 1.

FIGS. 7 and 8 are schematic views illustrating an exemplary schematic structure of a main portion of a backlight of Comparative Example 1.

FIG. 7 is a schematic perspective view illustrating the exemplary schematic structure of the main portion of the backlight of Comparative Example 1. FIG. 8 is a schematic plan view illustrating change in the polarization state of light in the backlight of Comparative Example 1.

In the backlight of Comparative Example 1, for example, as illustrated in FIGS. 7 and 8, the reflective polarizing plate RP, the ¼ wavelength plate QW, and the reflector RF are disposed so as to be in parallel with the short side direction of the light guide plate LG (in the x direction). Here, the backlight of Comparative Example 1 is different from the backlight according to Embodiment 1 only in the tilt of the reflective polarizing plate RP, the ¼ wavelength plate QW, and the reflector RF. The materials of the light sources LS and of the light guide plate LG, the shape and the number of the light extraction structures MP, and the like are the same. The brightness of a liquid crystal display device using the backlight of Comparative Example 1 is lower than that of the liquid crystal display device according to Embodiment 1.

In the backlight of Comparative Example 1, as illustrated in FIG. 7, light emitted from the light sources LS also propagates in the combining portion light guide plate LG1 to enter the reflective polarizing plate RP. Here, an S-polarized component of light emitted to the direction of the normal to the light emitting surfaces of the light sources LS is reflected by the reflective polarizing plate RP and returns to the light sources LS. The light sources LS (light emitting diodes) themselves do not have the function of reflecting light and the function of converting the polarization state of the light, and hence light which returns to the light sources LS (the S-polarized component) may not be reused. Therefore, the backlight of Comparative Example 1 may not reuse the most intense component of light emitted from the light sources LS. More specifically, the backlight of Comparative Example 1 may not produce light along the second optical path OP2 in the backlight according to Embodiment 1, and hence the brightness of the liquid crystal display device is lowered accordingly.

Further, light emitted from the light sources LS contain, for example, a component which tilts leftward with respect to the normal to the light emitting surfaces. An S-polarized component of such light emitted so as to tilt with respect to the normal to the light emitting surfaces is directed to the ¼ wavelength plate QW and the reflector RF after being reflected by the reflective polarizing plate RP, and hence the S-polarized component may be caused to propagate along the optical path OP2L after being converted to a P-polarized component.

However, the light emission distribution of light emitted from white light emitting diodes, which is used as the light sources LS, is not isotropic, and the light is particularly intense in the direction of the normal to the light emitting surfaces and the intensity is drastically decreased as the direction tilts from the normal. More specifically, light along an optical path OP1L and the optical path OP2L illustrated in FIG. 8 is P-polarized components, but the intensity is lower than that of a P-polarized component of a main component, that is, that of light along the first optical path OP1. Therefore, the backlight of Comparative Example 1 may not satisfactorily improve the use efficiency of light.

The structure of the backlight of Comparative Example 1 corresponds to, for example, the structure of the backlight having the conventional reflective polarizing plate disclosed in Japanese Patent Application Laid-open No. 2003-007114. Therefore, from the above-mentioned comparison, it may also be said that the use efficiency of light of the liquid crystal display device having the backlight according to Embodiment 1 is higher than that of a liquid crystal display device having a conventional backlight.

Comparative Example 2

Figure 9:
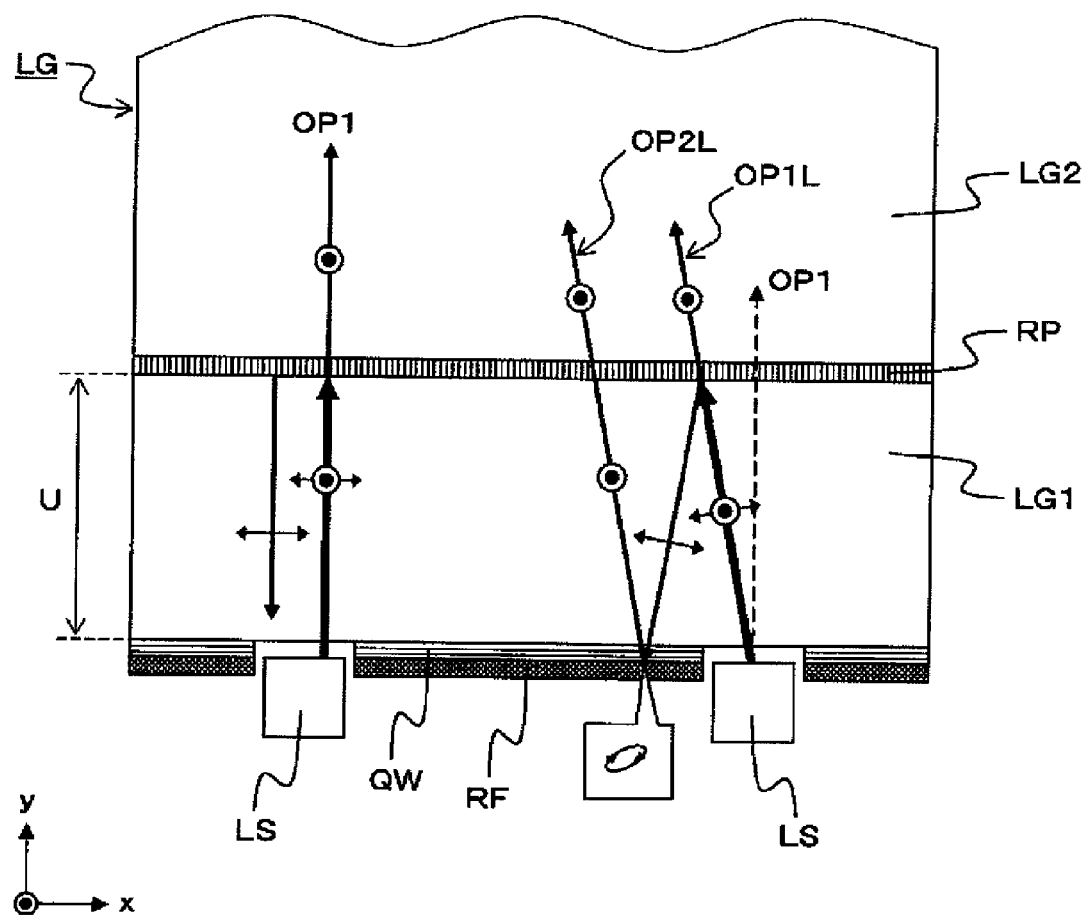
FIG. 9 is a schematic plan view illustrating change in a polarization state of light in a backlight of Comparative Example 2.

FIG. 9 is a schematic plan view illustrating change in the polarization state of light in a backlight of Comparative Example 2.

The backlight of Comparative Example 1 is capable of converting an S-polarized component of light which tilts with respect to the normal to the light emitting surfaces of the light sources LS to a P-polarized component as described above. In the backlight of Comparative Example 2, for example, as illustrated in FIG. 9, the distance U from the end portion of the combining portion light guide plate LG1 (light emitting surfaces of the light sources LS) to the reflective polarizing plate RP is longer than that of the backlight of the Comparative Example 1.

The backlight of Comparative Example 2 is similar to that of Comparative Example 1 in that the reflective polarizing plate RP and the reflector RF are in parallel with each other. However, in Comparative Example 2, the distance U from the end portion of the combining portion light guide plate LG1 to the reflective polarizing plate RP is increased, and hence the ratio of light to be directed to the light sources LS after being reflected by the reflective polarizing plate RP (S-polarized component) is smaller than that in the case of Comparative Example 1. Therefore, in the backlight of Comparative Example 2, compared with the case of Comparative Example 1, a component of emitted light which is closer to the direction of the normal is also directed to the ¼ wavelength plate QW and the reflector RF after being reflected by the reflective polarizing plate RP, and thus the amount of an S-polarized component which may be converted to a P-polarized component is increased.

However, even in the backlight of Comparative Example 2, the most intense component of emitted light is still directed to the light sources LS and may not be reused, and thus the use efficiency of light emitted from the light sources as a whole may not be satisfactorily improved. Therefore, although a liquid crystal display device having the backlight of Comparative Example 2 is improved in brightness to some extent compared with that of the liquid crystal display device having the backlight of Comparative Example 1, the brightness is still lower than that of the liquid crystal display device according to Embodiment 1.

Further, in the backlight of Comparative Example 2, the distance U from the end portion of the combining portion light guide plate LG1 to the reflective polarizing plate RP is increased, and accordingly when the liquid crystal display panel LCP overlies the light guide plate LG, the area which is not covered by the liquid crystal display panel LCP is increased. Therefore, the width of the liquid crystal display device having the backlight of Comparative Example 2 is larger than that of the liquid crystal display device according to Embodiment 1.

As described above, the liquid crystal display device according to Embodiment 1 is capable of improving the use efficiency of light emitted from the light sources LS, without increasing the small size of the liquid crystal display device. Therefore, the liquid crystal display device according to Embodiment 1 is capable of performing, for example, display in higher brightness while the power consumption of the liquid crystal display device is the same as that of a conventional liquid crystal display device. In other words, for example, the liquid crystal display device according to Embodiment 1 is capable of reducing the power consumption while the brightness of the liquid crystal display device is the same as that of a conventional liquid crystal display device. Therefore, when the liquid crystal display device according to Embodiment 1 is mounted on, for example, portable information equipment such as a cellular telephone, an advantage such as improvement of the visibility in a bright environment such as a bright outdoor environment and longer battery life may be obtained.

Embodiment 2

Figure 10:
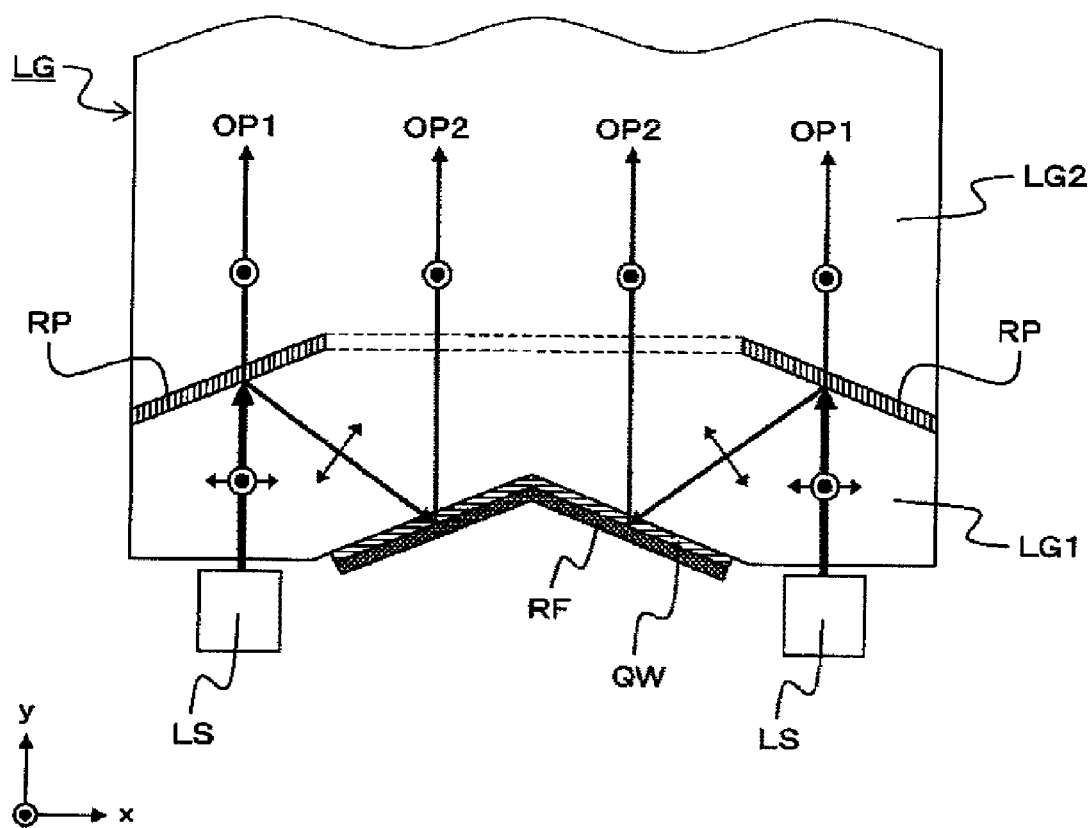
FIG. 10 is a schematic plan view illustrating a schematic structure of a main portion of a backlight, which illustrates the changes in the polarization state of light in a liquid crystal display device according to Embodiment 2 of the present invention.

FIG. 10 is a schematic plan view illustrating an exemplary schematic structure of a main portion of a backlight, which illustrates the changes in the polarization state of light in a liquid crystal display device according to Embodiment 2 of the present invention.

Because the structure of the liquid crystal display device according to Embodiment 2 is basically the same as that of the liquid crystal display device according to Embodiment 1, description of the whole structure of the liquid crystal display device is omitted. The liquid crystal display device according to Embodiment 2 is different from the liquid crystal display device according to Embodiment 1 only in arrangement of the reflective polarizing plate RP which is interposed between the combining portion light guide plate LG1 and the surface-emitting portion light guide plate LG2 of the backlight as illustrated in, for example, FIG. 10.

In the liquid crystal display device according to Embodiment 2, when the reflective polarizing plate RP is disposed between the combining portion light guide plate LG1 and the surface-emitting portion light guide plate LG2, the reflective polarizing plate RP is disposed only at portions through which a main component of light from the light sources LS passes, and is not disposed at a portion through which a P-polarized component obtained by conversion by the ¼ wavelength plate QW and the reflector RF passes.

Here, the portion at which the reflective polarizing plate RP is not disposed between the combining portion light guide plate LG1 and the surface-emitting portion light guide plate LG2 is, for example, filled with the same material as that of the combining portion light guide plate LG1 and the surface-emitting portion light guide plate LG2 or with a transparent resin the refractive index of which is substantially equal to that of the combining portion light guide plate LG1 and the surface-emitting portion light guide plate LG2.

Even in the backlight according to Embodiment 2, the most intense component of light emitted from the light sources LS, that is, the main component emitted in the direction (y direction) of the normal to the light emitting surfaces propagates, for example, as illustrated in FIG. 10, in the combining portion light guide plate LG1 to enter the reflective polarizing plate RP. Here, light emitted from the light sources LS is so-called natural light, and hence light which propagates in the combining portion light guide plate LG1 contains both a P-polarized component and an S-polarized component. When such light containing both a P-polarized component and an S-polarized component enters the reflective polarizing plate RP, the P-polarized component passes through the reflective polarizing plate RP while the S-polarized component is reflected. The P-polarized component which passes through the reflective polarizing plate RP propagates along the first optical path OP1 in the surface-emitting portion light guide plate LG2, and is emitted to the liquid crystal display panel LCP side after being reflected by the slant surfaces of the light extraction structures MP.

On the other hand, the S-polarized component reflected by the reflective polarizing plate RP is, similarly to the case of Embodiment 1, converted to a P-polarized component by the ¼ wavelength plate QW and the reflector RF, and is directed to the surface-emitting portion light guide plate LG2. The P-polarized component obtained by the conversion by the ¼ wavelength plate QW and the reflector RF propagates along the second optical path OP2 in the surface-emitting portion light guide plate LG2, and is reflected by the slant surfaces of the light extraction structures MP before being emitted to the liquid crystal display panel LCP side.

Meanwhile, the reflective polarizing plate RP is not a complete polarizing plate, and hence not all of a vibration component which is in parallel with the transmission axis passes through the reflective polarizing plate RP. Therefore, as in the case of Embodiment 1, if the converted P-polarized component is adapted to propagate in the surface-emitting portion light guide plate LG2 after passing through the reflective polarizing plate RP, the intensity of the P-polarized component which propagates along the second optical path OP2 is decreased after passing through the reflective polarizing plate RP.

On the other hand, in the backlight according to Embodiment 2, the converted P-polarized component reaches the surface-emitting portion light guide plate LG2 without passing through the reflective polarizing plate RP and propagates along the second optical path OP2. Therefore, the backlight according to Embodiment 2 may further improve the use efficiency of light compared with the backlight according to Embodiment 1.

Embodiment 3

Figure 11:
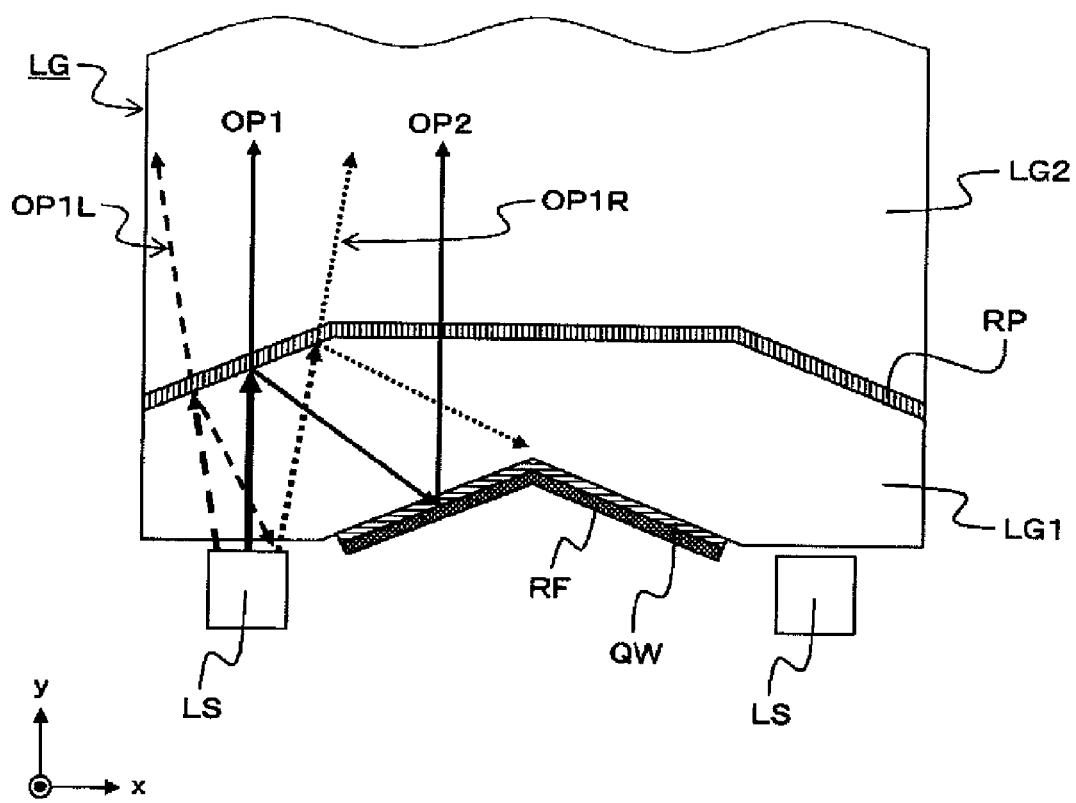
FIG. 11 is a schematic plan view for describing an improved example of the backlight according to Embodiment 1.

FIG. 11 is a schematic plan view for illustrating an improved example of the backlight according to Embodiment 1.

In the backlight of the liquid crystal display device according to Embodiment 1, an S-polarized component of light emitted from the light sources LS to the direction of the normal to the light emitting surfaces is converted to a P-polarized component, to thereby improve the use efficiency of light.

When the light sources LS are white light emitting diodes, light emitted from the light sources LS radially spreads. Therefore, when light emitted from the light sources LS enters the reflective polarizing plate RP, for example, as illustrated in FIG. 11, the angle of incidence on the reflective polarizing plate RP varies as the direction tilts away from the normal. Therefore, when the reflective polarizing plate RP is flat, light reflected by the reflective polarizing plate RP (an S-polarized component) is directed in a wider range.

Here, part of light emitted so as to tilt leftward with respect to the normal to the light emitting surfaces is, as illustrated in FIG. 11, reflected by the reflective polarizing plate RP, and then enters the light sources LS, and hence it may not be converted to a P-polarized component. Further, here, part of light emitted so as to tilt rightward with respect to the normal to the light emitting surfaces is, as illustrated in FIG. 11, directed to a place in which the ¼ wavelength plate QW and the reflector RF do not exist after being reflected by the reflective polarizing plate RP, and hence the part of light may not be converted to a P-polarized component. Although the intensity of those components of emitted light is not as high as that of the component of light emitted in the direction of the normal to the light emitting surfaces, the S-polarized components of those components of emitted light may not be converted to P-polarized components, which results in lowered use efficiency of light.

Further, light reflected by the reflective polarizing plate RP diffuses more because of its longer optical path compared with that of light which passes therethrough. Therefore, when the direction of travel of light is deviated from the direction of the normal, an S-polarized component is generated when the light is reflected by the prism-like protrusions (light extraction structures MP) on the lower surface of the light guide plate and when, after that, the light is reflected by the prism sheets PS2 and PS1. As described above, an S-polarized component is less likely to pass through the light guide plate to the outside thereof. Further, the direction of vibration of an S-polarized component is close to the angle of the absorption axis of the second polarizing plate PL2, and hence, even if the S-polarized component has passed through the light guide plate to the outside thereof, the S-polarized component is absorbed by the second polarizing plate PL2.

As described above, the use efficiency of light of the backlight according to Embodiment 1 or Embodiment 2 is higher than that of a conventional backlight, but there still is room for improving the use efficiency.

FIGS. 12 to 15 are schematic views for illustrating exemplary structures of a main portion of a backlight and describing change in the polarization state of light in a liquid crystal display device according to Embodiment 3 of the present invention.

Figure 12:
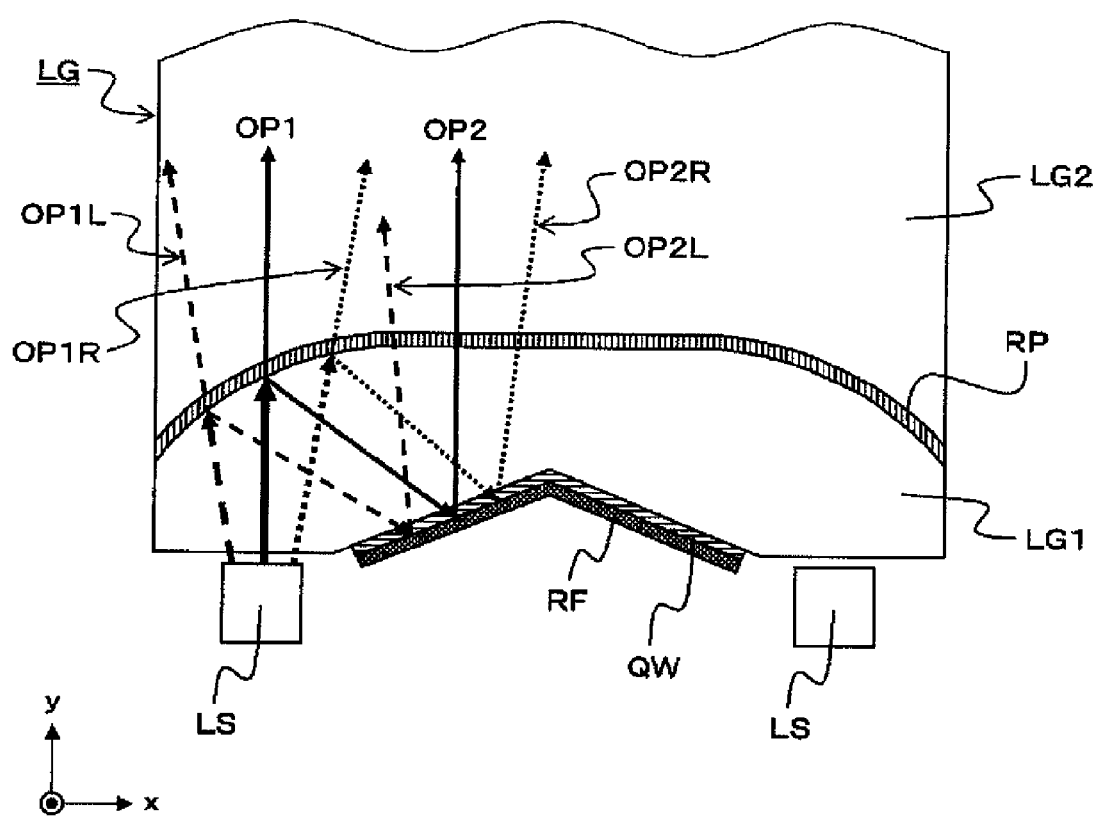
FIG. 12 is a schematic plan view illustrating a first example of a schematic structure of a main portion of a backlight, which illustrates the changes in a polarization state of light in a liquid crystal display device according to Embodiment 3 of the present invention.
Figure 13:
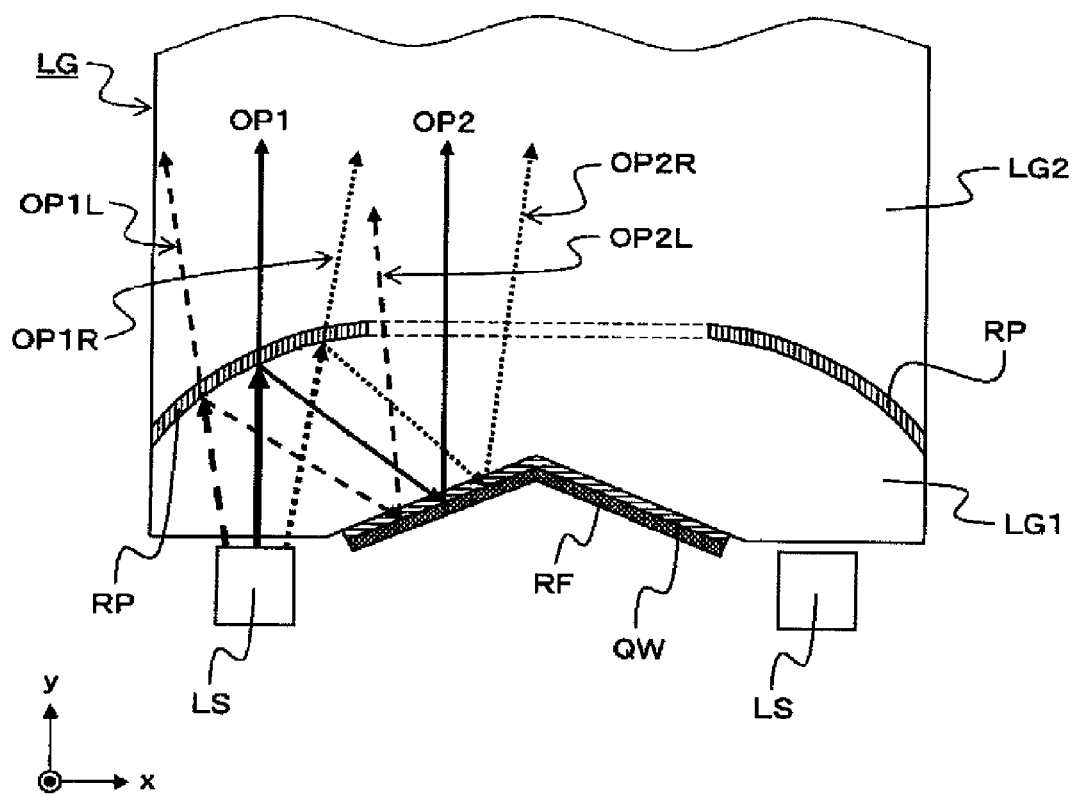
FIG. 13 is a schematic plan view illustrating a second example of the schematic structure of the main portion of the backlight, which illustrates the changes in the polarization state of light in the liquid crystal display device according to Embodiment 3.
Figure 14:
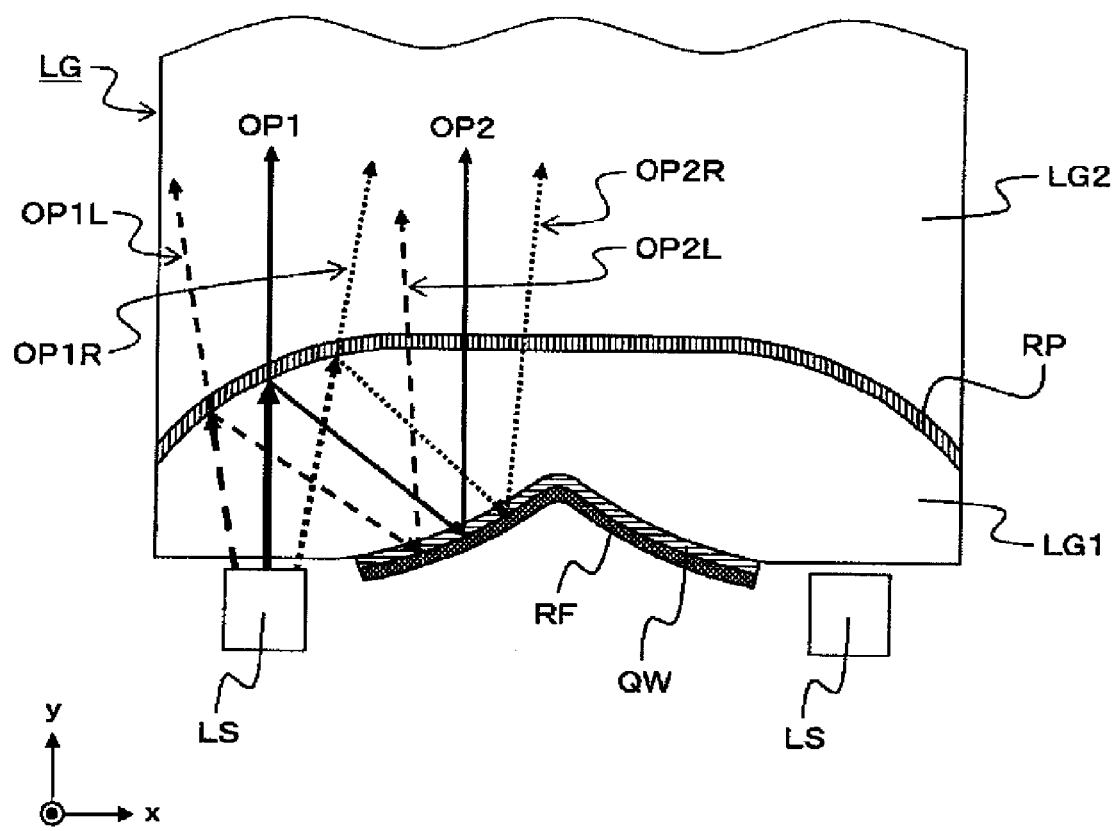
FIG. 14 is a schematic plan view illustrating a third example of the schematic structure of the main portion of the backlight, which illustrates the changes in the polarization state of light in the liquid crystal display device according to Embodiment 3.
Figure 15:
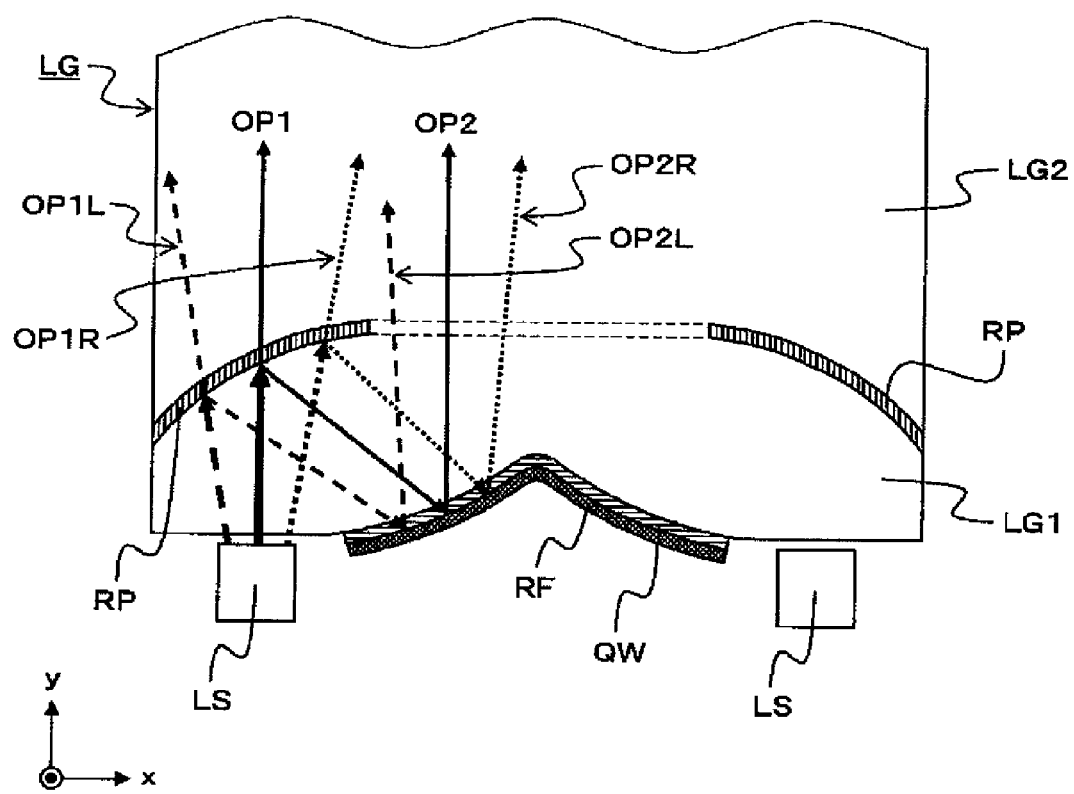
FIG. 15 is a schematic plan view illustrating a fourth example of the schematic structure of the main portion of the backlight, which illustrates the changes in the polarization state of light in the liquid crystal display device according to Embodiment 3.

FIG. 12 is a schematic plan view illustrating a first example of a schematic structure of a main portion of the backlight, which illustrates the changes in the polarization state of light in the liquid crystal display device according to Embodiment 3 of the present invention. FIG. 13 is a schematic plan view illustrating a second example of the schematic structure of the main portion of the backlight, which illustrates the changes in the polarization state of light in the liquid crystal display device according to Embodiment 3. FIG. 14 is a schematic plan view illustrating a third example of the schematic structure of the main portion of the backlight, which illustrates the changes in the polarization state of light in the liquid crystal display device according to Embodiment 3. FIG. 15 is a schematic plan view illustrating a fourth example of the schematic structure of the main portion of the backlight, which illustrates the changes in the polarization state of light in the liquid crystal display device according to Embodiment 3.

In the liquid crystal display device according to Embodiment 3, in order to improve the use efficiency of an S-polarized component of light which travels so as to tilt with respect to the normal to the light emitting surfaces of the light sources LS, for example, as illustrated in FIG. 12, portions of the reflective polarizing plate RP through which a main component of light from the light sources LS passes are made to be curved surfaces so as to be concave to the light sources LS side (to incident light). With this configuration, light reflected by the reflective polarizing plate RP is directed to the ¼ wavelength plate QW and the reflector RF without spreading. When the angle distribution of light reflected by the reflective polarizing plate RP (of an S-polarized component) is made smaller as described above, reentry of the light into the light sources LS and reflection of the light in directions in which the ¼ wavelength plate QW and the reflector RF do not exist may be prevented.

Further, in the case of the backlight having the structure illustrated in FIG. 12, because the angle distribution of light reflected by the reflective polarizing plate RP is made smaller, the angle distribution of a P-polarized component obtained by conversion by the ¼ wavelength plate QW and the reflector RF is made smaller accordingly, and the difference between the directions of the optical paths OP2L and OP2R and the direction of the second optical path OP2 is reduced. Therefore, the backlight having the structure illustrated in FIG. 12 is capable of minimizing the amount of an S-polarized component generated due to the deviation from the direction of the normal as described above, to thereby reduce a loss of the use efficiency due to absorption by the second polarizing plate PL2 and the like.

It should be noted that the structure illustrated in FIG. 12 is based on the structure of Embodiment 1, and a P-polarized component obtained by conversion by the ¼ wavelength plate QW and the reflector RF passes through the reflective polarizing plate RP and then propagates in the surface-emitting portion light guide plate LG2. Here, the intensity of the converted P-polarized component is decreased when the P-polarized component passes through the reflective polarizing plate RP, and accordingly, in the case of the backlight having the structure illustrated in FIG. 12, the use efficiency of light is lowered.

In order to avoid the loss of the use efficiency of light, there may be employed a structure based on the structure of Embodiment 2, for example, as illustrated in FIG. 13, in which the reflective polarizing plate RP is not disposed at a portion through which a P-polarized component obtained by conversion by the ¼ wavelength plate QW and the reflector RF passes.

Further, with the structures illustrated in FIGS. 12 and 13, the ¼ wavelength plate QW and the reflector RF are flat, and hence the angle distribution of light reflected by the reflector RF is wider. Therefore, in the cases of the structures illustrated in FIGS. 12 and 13, the use efficiency of light is higher than that of the structures of Embodiment 1 and Embodiment 2, but there still is room for improving the use efficiency.

In order to suppress spread of the angle distribution of light reflected by the reflector RF, for example, as illustrated in FIG. 14, the arrangement of the ¼ wavelength plate QW and the reflector RF in plan view is also made to be curved surfaces so as to be concave to the combining portion light guide plate LG1 side (to incident light). With this configuration, the difference between the directions of the optical paths OP2L and OP2R and the direction of the second optical path OP2 may further be reduced.

Further, the structure illustrated in FIG. 14 is based on the structure of Embodiment 1, in which a P-polarized component obtained by conversion by the ¼ wavelength plate QW and the reflector RF passes through the reflective polarizing plate RP and then propagates in the surface-emitting portion light guide plate LG2. Here, the intensity of the converted P-polarized component is decreased when the P-polarized component passes through the reflective polarizing plate RP, and accordingly, in the case of the backlight having the structure illustrated in FIG. 14, the use efficiency of light is lowered.

In order to avoid the loss of the use efficiency of light, there may be employed a structure based on the structure of Embodiment 2, for example, as illustrated in FIG. 15, in which the reflective polarizing plate RP is not disposed at a portion through which a P-polarized component obtained by conversion by the ¼ wavelength plate QW and the reflector RF passes.

It should be noted that, in the backlight of Embodiment 3, the curvatures of the curved surfaces of the reflective polarizing plate RP and of the curved surfaces of the ¼ wavelength plate QW and the reflector RF may be modified as appropriate, and it goes without saying that the curvatures may be optimized according to the distance between the light sources LS, the distance from the end portion of the combining portion light guide plate LG1 to the farthest portion of the reflective polarizing plate RP, and the like.

As described above, in the liquid crystal display device according to Embodiment 3, a component of emitted light reflected by the reflective polarizing plate RP which may not be reused, for example, light which returns to the light sources LS, is decreased and a component which propagates so as to be in parallel with a long side of the light guide plate is increased, to thereby further improve the light use efficiency, with the result that display in higher brightness is attained.

Embodiment 4

Figure 16:
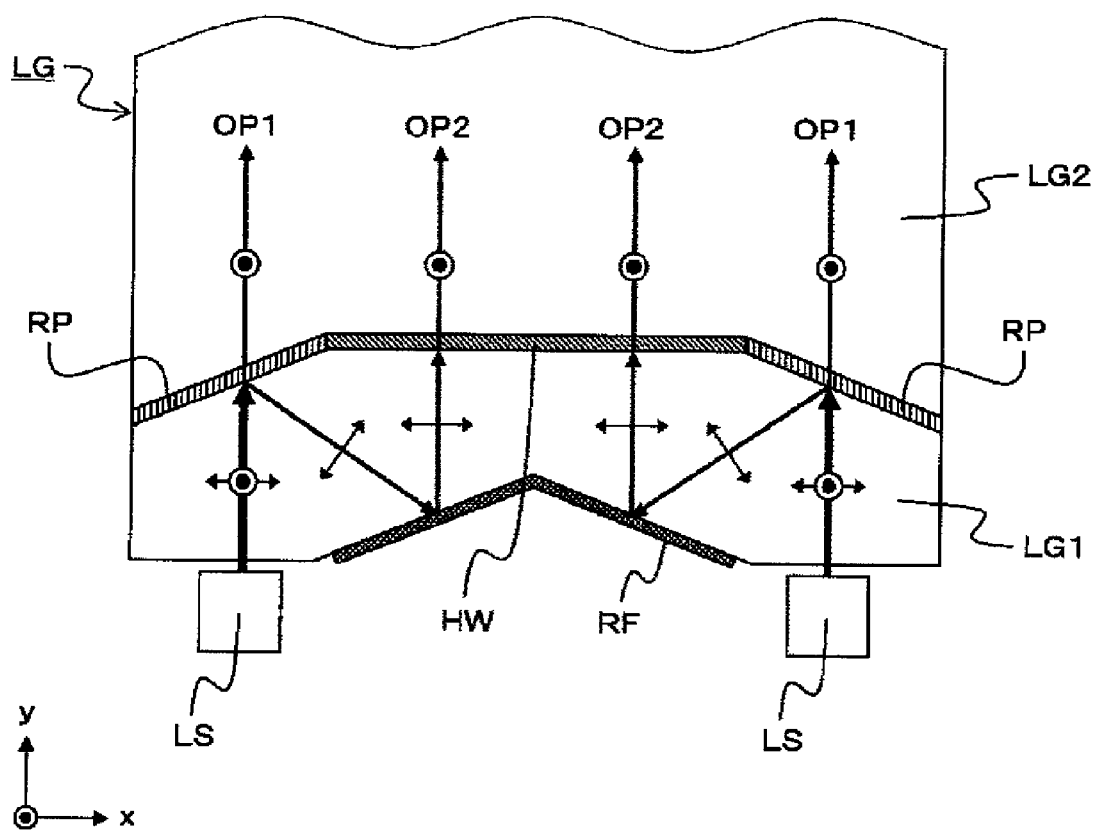
FIG. 16 is a schematic plan view illustrating a schematic structure of a main portion of a backlight, which illustrates the changes in a polarization state of light in a liquid crystal display device according to Embodiment 4 of the present invention.

FIG. 16 is a schematic plan view illustrating an exemplary schematic structure of a main portion of a backlight, which illustrates the changes in the polarization state of light in a liquid crystal display device according to Embodiment 4 of the present invention.

Because the structure of the liquid crystal display device according to Embodiment 4 is basically the same as that of the liquid crystal display device according to Embodiment 1, description of the whole structure of the liquid crystal display device is omitted. The liquid crystal display device according to Embodiment 4 is different from the liquid crystal display device according to Embodiment 1 in that the reflective polarizing plate RP and a ½ wavelength plate HW are interposed between the combining portion light guide plate LG1 and the surface-emitting portion light guide plate LG2 of the backlight and only the reflector RF is disposed at the end portion of the combining portion light guide plate LG1 as illustrated in, for example, FIG. 16.

Here, similarly to the case of the backlight according to Embodiment 2, the reflective polarizing plate RP is disposed only at portions through which a main component of light from the light sources LS passes. Further, the ½ wavelength plate HW is disposed at a portion through which light reflected by the reflective polarizing plate RP and the reflector RF passes. Further, here, the ½ wavelength plate HW is disposed such that a slow axis thereof tilts 45 degrees with respect to the thickness direction (z direction) of the light guide plate LG.

Even in the backlight according to Embodiment 4, the most intense component of light emitted from the light sources LS, that is, the main component emitted in the direction (y direction) of the normal to the light emitting surfaces propagates, for example, as illustrated in FIG. 16, in the combining portion light guide plate LG1 to enter the reflective polarizing plate RP. Here, light emitted from the light sources LS is so-called natural light, and hence light which propagates in the combining portion light guide plate LG1 contains both a P-polarized component and an S-polarized component. When such light containing both a P-polarized component and an S-polarized component enters the reflective polarizing plate RP, the P-polarized component passes through the reflective polarizing plate RP while the S-polarized component is reflected. The P-polarized component which passes through the reflective polarizing plate RP propagates along the first optical path OP1 in the surface-emitting portion light guide plate LG2, and is emitted to the liquid crystal display panel LCP side after being reflected by the slant surfaces of the light extraction structures MP.

On the other hand, light reflected by the reflective polarizing plate RP (S-polarized component) is reflected by the reflector RF, and then, enters the ½ wavelength plate HW as remaining in the S-polarized state. Here, the direction of vibration of light which enters the ½ wavelength plate HW (an S-polarized component) forms an angle of 45 degrees with the slow axis of the ½ wavelength plate HW, and hence the direction of vibration thereof is rotated 90 degrees in the course of passing through the ½ wavelength plate HW and the light is converted to a P-polarized component to be emitted. The P-polarized component obtained by conversion by the ½ wavelength plate HW propagates along the second optical path OP2 in the surface-emitting portion light guide plate LG2, and is reflected by the slant surfaces of the light extraction structures MP before being emitted to the liquid crystal display panel LCP side.

As described above, in the backlight having the structure illustrated in FIG. 16, similarly to the backlights using the ¼ wavelength plate QW according to Embodiment 1 to Embodiment 3, an S-polarized component of light emitted from the light sources LS may be converted to an P-polarized component and the P-polarized component may propagate in the surface-emitting portion light guide plate LG2. Therefore, the liquid crystal display device according to Embodiment 4 with the backlight having the structure illustrated in FIG. 16 is capable of improving the use efficiency of light emitted from a light source.

Further, in the backlights according to Embodiment 1 to Embodiment 3, the ¼ wavelength plate QW and the reflector RF are laminated, and, in the course of converting light reflected by the reflective polarizing plate RP from an S-polarized state to a P-polarized state, the light passes through the ¼ wavelength plate QW twice. On the other hand, in the backlight according to Embodiment 4, in the course of converting light reflected by the light reflective polarizing plate RP from an S-polarized state to a P-polarized state, the light passes through the ½ wavelength plate HW only once. Accordingly, in the backlight according to Embodiment 4, in the course of converting light from an S-polarized state to a P-polarized state, the number of times the light passes through the wavelength plate is reduced, which leads to an advantage that, for example, the ½ wavelength plate HW suffers less deterioration even when the use time becomes longer.

Embodiment 5

Figure 17:
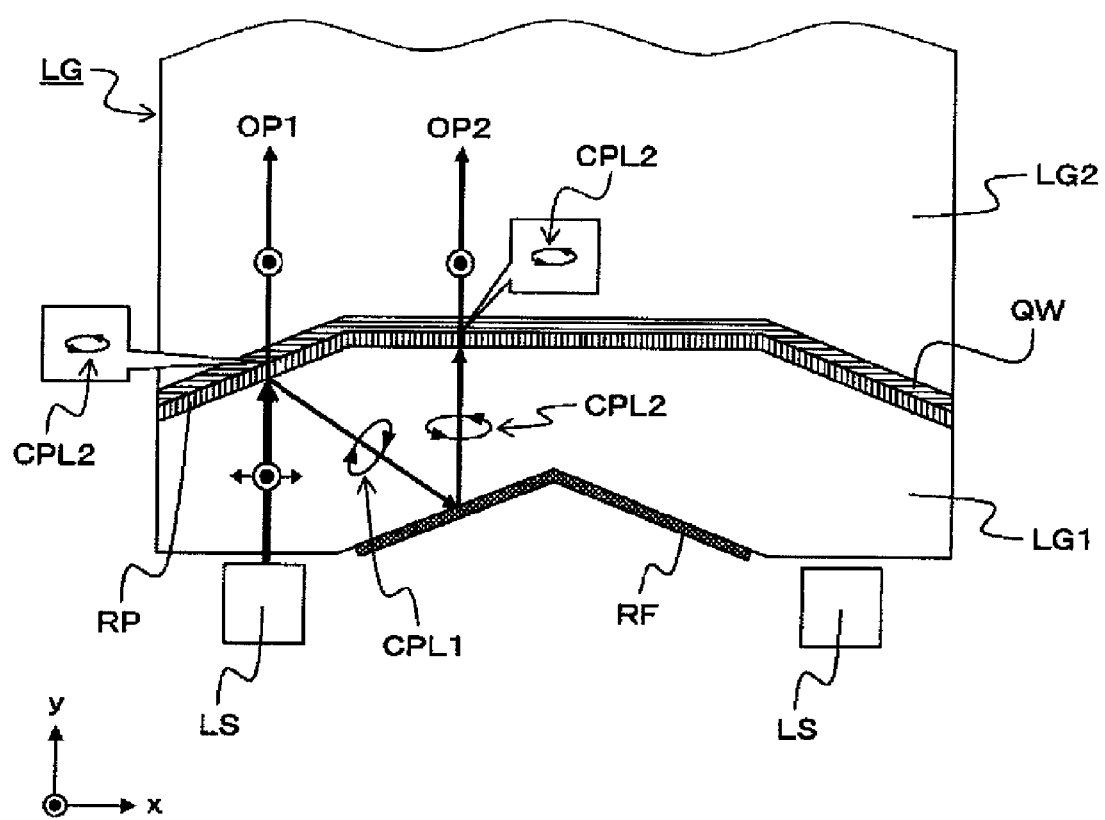
FIG. 17 is a schematic plan view illustrating a schematic structure of a main portion of a backlight, which illustrates the changes in a polarization state of light in a liquid crystal display device according to Embodiment 5 of the present invention.

FIG. 17 is a schematic plan view illustrating an exemplary schematic structure of a main portion of a backlight, which illustrates the changes in the polarization state of light in a liquid crystal display device according to Embodiment 5 of the present invention.

Because the structure of the liquid crystal display device according to Embodiment 5 is basically the same as that of the liquid crystal display device according to Embodiment 1, description of the whole structure of the liquid crystal display device is omitted. The liquid crystal display device according to Embodiment 5 is different from the liquid crystal display device according to Embodiment 1 in that the ¼ wavelength plate QW is disposed between the surface-emitting portion light guide plate LG2 and the reflective polarizing plate RP of the backlight and only the reflector RF is disposed at the end portion of the combining portion light guide plate LG1, as illustrated in, for example, FIG. 17.

Here, the reflective polarizing plate RP and the ¼ wavelength plate QW are each disposed both at portions through which a main component of light from the light sources LS passes and a portion through which light reflected by the reflector RF passes. Further, here, the ¼ wavelength plate QW is disposed such that a slow axis thereof tilts 45 degrees with respect to the thickness direction (z direction) of the light guide plate LG.

Further, in the backlight according to Embodiment 5, a polymer cholesteric liquid crystal layer is used as the reflective polarizing plate RP. A polymer cholesteric liquid crystal layer has a twisted structure. When the pitch of the twisted structure is equal to the wavelength of light in the visible range which passes through the layer so as to be in parallel with the twist axis, the polymer cholesteric liquid crystal layer separates incident light into clockwise circularly polarized light and counterclockwise circularly polarized light and reflects a circularly polarized component whose rotation direction is the same as its own direction of twist. In the backlight of Embodiment 5, a polymer cholesteric liquid crystal layer having a rightward twisted structure is used as the reflective polarizing plate RP and is disposed at the same location as in Embodiment 1.

The cycloolefin organic polymer is used for forming the ¼ wavelength plate QW as in Embodiment 1, which is disposed between the reflective polarizing plate RP and the surface-emitting portion light guide plate LG2.

Even in the backlight according to Embodiment 5, the most intense component of light emitted from the light sources LS, that is, the main component emitted in the direction (y direction) of the normal to the light emitting surfaces propagates, for example, as illustrated in FIG. 17, in the combining portion light guide plate LG1 to enter the reflective polarizing plate RP. Here, light emitted from the light sources LS is so-called natural light, and hence light which propagates in the combining portion light guide plate LG1 contains both a P-polarized component and an S-polarized component. When such light containing both a P-polarized component and an S-polarized component enters the reflective polarizing plate RP (polymer cholesteric liquid crystal layer), the incident light is separated into clockwise circularly polarized light CPL1 and counterclockwise circularly polarized light CPL2. Here, the counterclockwise circularly polarized light CPL2 passes through the reflective polarizing plate RP and enters the ¼ wavelength plate QW. Because a slow axis of the ¼ wavelength plate QW forms an angle of 45 degrees with the thickness direction of the light guide plate, the incident counterclockwise circularly polarized light CPL2 is converted to linearly polarized light the direction of vibration of which is in the thickness direction of the light guide plate, that is, a P-polarized component, to be emitted to the surface-emitting portion light guide plate LG2 side. Here, the P-polarized component emitted to the surface-emitting portion light guide plate LG2 propagates along the first optical path OP1 in the surface-emitting portion light guide plate LG2, and is reflected by the slant surfaces of the light extraction structures MP, before being emitted to the liquid crystal display panel LCP side.

On the other hand, the clockwise circularly polarized light CPL1 is reflected by the reflective polarizing plate RP to be directed to the reflector RF. When the clockwise circularly polarized light CPL1, which is directed to the reflector RF, is reflected by the reflector RF, the light is reversed in direction of rotation thereof to become counterclockwise circularly polarized light CPL2, which is directed to the reflective polarizing plate RP. Here, the counterclockwise circularly polarized light CPL2 passes through the reflective polarizing plate RP as remaining in the polarization state. In the course of passing through the ¼ wavelength plate QW, the counterclockwise circularly polarized light CPL2 is converted to a P-polarized light to be emitted to the surface-emitting portion light guide plate LG2. Here, the P-polarized component emitted to the surface-emitting portion light guide plate LG2 propagates along the second optical path OP2 in the surface-emitting portion light guide plate LG2, and is reflected by the slant surfaces of the light extraction structures MP before being and is emitted to the liquid crystal display panel LCP side.

In this way, even when a polymer cholesteric liquid crystal layer is used as the reflective polarizing plate RP, an S-polarized component of light from the light sources LS may be converted to a P-polarized component.

Further, in the backlight according to Embodiment 5, as the reflective polarizing plate RP, a polymer cholesteric liquid crystal layer having a rightward twisted structure is used, but the present invention is not limited thereto. Even when a polymer cholesteric liquid crystal layer having a leftward twisted structure is used, an S-polarized component of light from the light sources LS may be similarly converted to a P-polarized component. However, in this case, it is necessary to shift the direction of the slow axis of the ¼ wavelength plate QW by 90 degrees from that in the case of the rightward twisted structure.

Meanwhile, the wavelength range in which the polymer cholesteric liquid crystal layer exhibits the above-mentioned characteristics is in proportion to its double refraction value, which is about 100 nm even when the double refraction value is at the maximum. Therefore, a plurality of polymer cholesteric liquid crystal layers having different pitches of the twisted structures may be laminated, to thereby cause the polymer cholesteric liquid crystal layer to act as described above with regard to light of all the wavelengths of visible light. Alternatively, a polymer cholesteric liquid crystal layer in which the pitch of the twisted structure is continuously changed may also be used instead of laminating a plurality of polymer cholesteric liquid crystal layers having different pitches of the twisted structures, and a similar effect may still be obtained.

The polymer cholesteric liquid crystal layer may be prepared as follows. A solution in which a chiral material is mixed with low molecular photopolymerizable liquid crystal is applied on a base which has been subjected to horizontal alignment treatment, and light is irradiated thereon to carry out polymerization. Therefore, by repeating the process a plurality of times, a plurality of polymer cholesteric liquid crystal layers having different pitches of the twisted structures may be laminated. Here, if a flexible plastic thin film is used as the base, lamination on the junction of the combining portion light guide plate is possible. Alternatively, when a polymer cholesteric liquid crystal layer is laminated may also be formed by directly applying the low molecular photopolymerizable liquid crystal onto the junction of the combining portion light guide plate LG1, without using the base, and carrying out photopolymerization thereof.

Further, the ¼ wavelength plate QW is laminated on the junction of the surface-emitting portion light guide plate LG2 and the reflective polarizing plate RP is laminated on the junction of the combining portion light guide plate LG1. With this configuration, when the surface-emitting portion light guide plate LG2 and the combining portion light guide plate LG1 are combined with each other, the ¼ wavelength plate QW and the reflective polarizing plate RP may be disposed so as to be in proximity to each other and the reflective polarizing plate RP may be disposed so as to be in proximity to the light sources LS.

Embodiment 6

Figure 18:
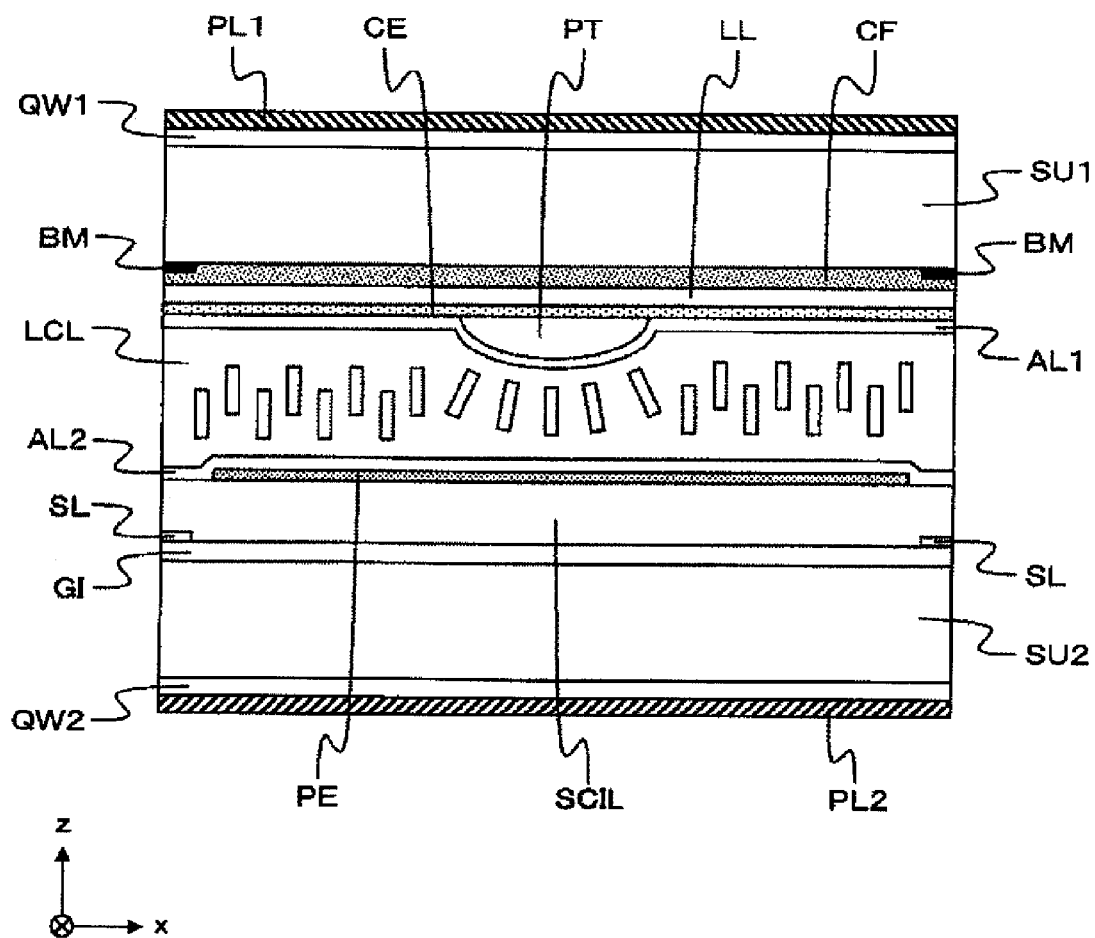
FIG. 18 is a schematic sectional view illustrating a schematic structure of a main portion of a liquid crystal display panel in a liquid crystal display device according to Embodiment 6 of the present invention.

FIG. 18 is a schematic sectional view illustrating an exemplary schematic structure of a main portion of a liquid crystal display panel in a liquid crystal display device according to Embodiment 6 of the present invention.

In Embodiment 1, as an exemplary liquid crystal display panel LCP used in the liquid crystal display device according to the present invention, the IPS liquid crystal display panel having the structure illustrated in FIGS. 3 to 5 is described. However, the liquid crystal display device according to the present invention is characterized by the structure of the light guide plate LG of the backlight, and the structure of the liquid crystal display panel LCP may be any of conventional transmissive or transflective liquid crystal display panels as described above. Therefore, in Embodiment 6, as another exemplary structure of the liquid crystal display panel LCP which may be used in the liquid crystal display device according to the present invention, a VA liquid crystal display panel is described.

The VA liquid crystal display panel LCP has, for example, as illustrated in FIG. 18, a first ¼ wavelength plate QW1 disposed between the first polarizing plate PL1 and the first substrate SU1 and a second ¼ wavelength plate QW2 disposed between the second polarizing plate PL2 and the second substrate SU2. Here, the first ¼ wavelength plate QW1 and the second ¼ wavelength plate QW2 are disposed such that, when viewed from the direction (z axis) of the normal to the substrate, the slow axes thereof are orthogonal to each other and form an angle of 45 degrees with the transmission axes of the first polarizing plate PL1 and the second polarizing plate PL2.

It should be noted that the liquid crystal display device according to Embodiment 6 has one of the backlights according to Embodiment 1 to Embodiment 5. Therefore, as described in Embodiment 1, light from the backlight which enters the second polarizing plate PL2 is linearly polarized light the direction of vibration of which is in the long side direction of the liquid crystal display panel LCP. Therefore, even in the case of a VA liquid crystal display panel LCP, the second polarizing plate PL2 is disposed such that the transmission axis thereof is in the long side direction of the liquid crystal display panel LCP. With this configuration, the liquid crystal display device according to Embodiment 6 having the VA liquid crystal display panel LCP allows light from the backlight to be used with a high degree of efficiency.

Further, in the VA liquid crystal display panel LCP, the common electrode CE is disposed on a surface of the first substrate SU1, the surface being in proximity to the liquid crystal layer. Further, the pixel electrode PE is formed in a rectangular shape which is equivalent to the shape of a pixel, and is disposed on a surface of the second substrate SU2, the surface being in proximity to the liquid crystal layer.

Further, in the VA liquid crystal display panel LCP, the first alignment film AL1 and the second alignment film AL2 are aligned perpendicularly to each other and disposed such that the direction of the major axis of liquid crystal molecules of the liquid crystal layer LCL is substantially perpendicular to the plane of the substrate. Further, here, the permittivity anisotropy of the liquid crystal material used for the liquid crystal layer LCL is negative and the permittivity in the direction of alignment is smaller than that in a direction perpendicular thereto.

When a vertical electric field is applied to the liquid crystal layer LCL of perpendicular alignment which has negative permittivity anisotropy, the tilt angle of the liquid crystal molecules decreases and the alignment of the liquid crystal layer LCL is inclined to an arbitrary azimuth angle. Here, in order to determine the azimuth angle without the effect of thermal fluctuations, an alignment control structure PT is disposed in a pixel. In Embodiment 5, the alignment control structure PT is disposed on the surface of the first substrate SU1, the surface being in proximity to the liquid crystal layer, and more specifically, between the common electrode CE and the first alignment film AL1. The shape of the alignment control structure PT in plan view is linear and is in parallel with a long side direction of a pixel. The alignment control structure PT is disposed so as to divide a pixel into halves. The alignment control structure PT is, similarly to the columnar spacers, formed of a transparent organic film, which is patterned so as to be in a linear fashion and then heated into a melting state, to thereby form the shape thereof in section into substantially a quadric curve. Here, liquid crystal molecules in proximity to the alignment control structure PT are aligned so as to be perpendicular to a surface of the alignment control structure PT, and hence the alignment of the liquid crystal layer LCL is inclined to some extent with respect to the normal to the substrate in proximity to the alignment control structure PT. Further, in proximity to the alignment control structure PT, the direction of the electric field is inclined to some extent with respect to the normal to the substrate. By those effects, the azimuth angle of the liquid crystal layer LCL when an electric field is applied thereto is determined so as to be perpendicular to the alignment control structure PT, and the tilt angles with regard to a right side and a left side of the alignment control structure PT are symmetrical.

In the VA liquid crystal display panel LCP, two regions in which the tilt angles are symmetrical are generated in one pixel which are substantially the same in area, and hence viewing angle dependence of the two regions is cancelled out, with the result that the viewing angle characteristics of one pixel are improved. Further, light which enters the liquid crystal layer LCL is circularly polarized light due to the operation of the second ¼ wavelength plate QW2, is directed, the polarization state of light which passes therethrough may be changed by the phase difference regardless of the direction of the liquid crystal alignment. Therefore, in the VA liquid crystal display panel LCP, when white is produced, the transmittance is improved in a large region of a pixel except for a center portion of the alignment control structure PT.

Further, when disposing the alignment control structure PT in the VA liquid crystal display panel LCP, for example, two or more alignment control structures PT may be disposed in one pixel, the alignment control structures PT each being formed in a circular shape. In this case, the pixel electrode PE in one pixel may include the alignment control structures PT and subpixel electrodes which are equal in number to the alignment control structures PT. Each of the subpixel electrodes is in a shape of a square or a rectangle close to a square in plan view, with the alignment control structure PT disposed at the center thereof. Further, here, in order to secure continuity between the respective subpixel electrodes, the subpixel electrodes are coupled at a center portion of a pixel. In this case, when voltage is applied, the direction of alignment of the liquid crystal layer LCL is rotationally symmetrical with respect to the alignment control structure PT. Therefore, azimuth angle dependence of the viewing angle characteristics is cancelled out and the viewing angle characteristics are improved compared with a case in which the above-mentioned linear alignment control structure PT is used.

Embodiment 7

Figure 19:
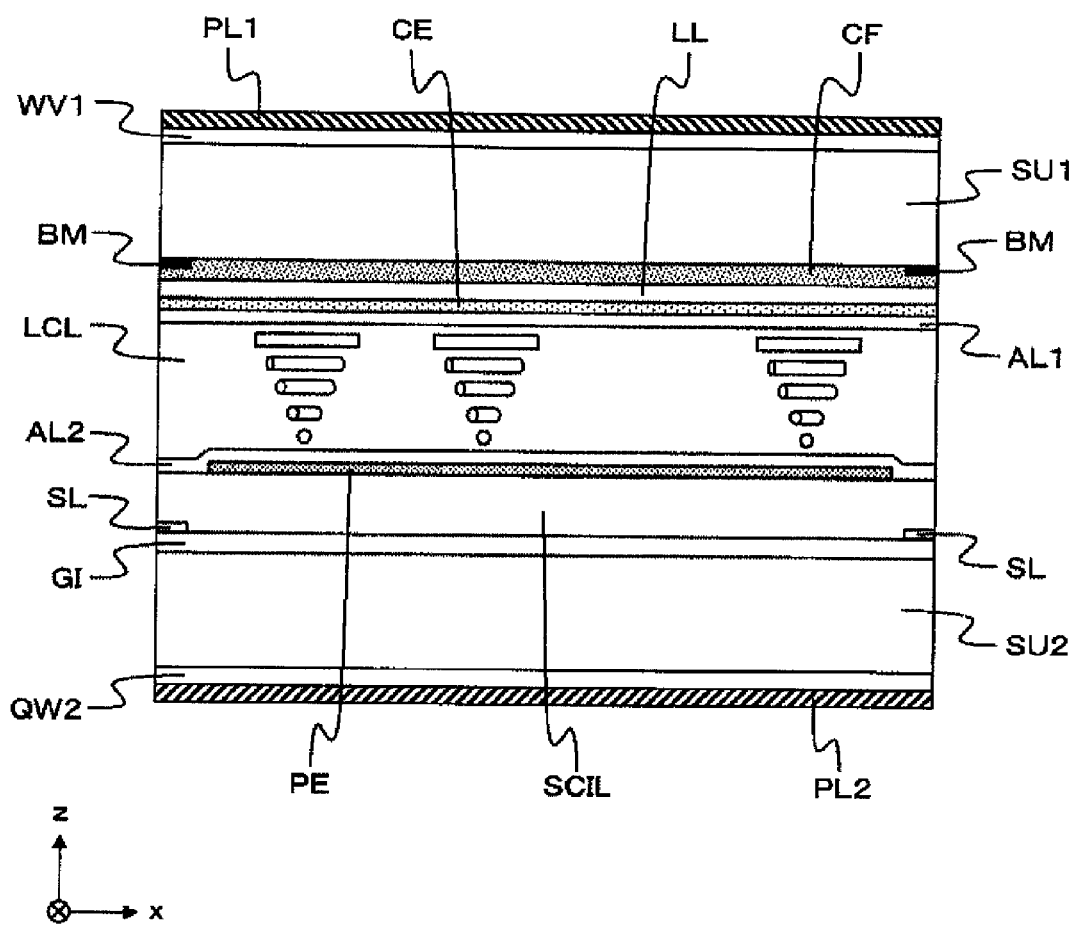
FIG. 19 is a schematic sectional view illustrating a schematic structure of a main portion of a liquid crystal display panel in a liquid crystal display device according to Embodiment 7 of the present invention.

FIG. 19 is a schematic sectional view illustrating an exemplary schematic structure of a main portion of a liquid crystal display panel in a liquid crystal display device according to Embodiment 7 of the present invention.

In Embodiment 7, as further another exemplary structure of the liquid crystal display panel LCP which may be used in the liquid crystal display device according to the present invention, a TN liquid crystal display panel is described.

The TN liquid crystal display panel LCP includes, for example, as illustrated in FIG. 19, a first viewing angle magnification film WV1 between the first polarizing plate PL1 and the first substrate SU1 and a second viewing angle magnification film WV2 between the second polarizing plate PL2 and the second substrate SU2.

Further, in the TN liquid crystal display panel LCP, the common electrode CE is disposed on a surface of the first substrate SU1 which is in proximity to the liquid crystal layer. Further, the pixel electrode PE is in the rectangular shape which is equivalent to the shape of a pixel, and is disposed on a surface of the second substrate SU2 which is in proximity to the liquid crystal layer.

Further, in the TN liquid crystal display panel LCP, the first alignment film AL1 and the second alignment film AL2 are horizontal alignment films similarly to the case of Embodiment 1, and are subjected to alignment treatment by being rubbed such that the directions of alignment of the former and the latter are the short side direction and the long side direction of the liquid crystal display panel LCP, respectively. More specifically, the direction of alignment of the first alignment film AL1 and the direction of alignment of the second alignment film AL2 are adapted to form an angle of 90 degrees. Here, the liquid crystal layer LCL has a twisted alignment according to the directions of alignment of the first alignment film AL1 and the second alignment film AL2. Further, here, the permittivity anisotropy of the liquid crystal material is positive and the permittivity in the direction of alignment is larger than that in a direction perpendicular thereto. Further, a chiral material which is a rotatory material is added to the liquid crystal layer LCL such that the liquid crystal layer LCL has a spontaneous twisted alignment and the twisted alignment thereof is stabilized.

In such a liquid crystal display panel LCP, because the direction of vibration of linearly polarized light which passes through the second polarizing plate PL2 is rotated along the twisted alignment of the liquid crystal layer LCL when no voltage is applied thereto, the light passes through the first polarizing plate PL1 to produce white. When voltage is applied to the liquid crystal layer LCL, the tilt angle of the liquid crystal layer LCL increases, and, when the voltage is high enough, the alignment is close to perpendicular alignment. Here, the liquid crystal layer LCL becomes optically isotropic and produces black.

It should be noted that the liquid crystal display device according to Embodiment 7 includes one of the backlights according to Embodiment 1 to Embodiment 5. Therefore, as described in Embodiment 1, light from the backlight which enters the second polarizing plate PL2 is linearly polarized light the direction of vibration of which is the long side direction of the liquid crystal display panel LCP. Therefore, in the case of the TN liquid crystal display panel LCP, also, the second polarizing plate PL2 is disposed such that the transmission axis thereof is in the long side direction of the liquid crystal display panel LCP. This makes it possible that the liquid crystal display device according to Embodiment 7 including the TN liquid crystal display panel LCP uses light from the backlight with a high degree of efficiency.

Further, in the TN liquid crystal display panel LCP, in order to improve the viewing angle characteristics, for example, a first viewing angle compensating layer may be disposed between the first polarizing plate PL1 and the first substrate SU1 and a second viewing angle compensating layer may be disposed between the second polarizing plate PL2 and the second substrate SU2. In the TN liquid crystal display panel LCP, the liquid crystal layer LCL exhibits a large tilt angle in halftone display, which is a cause of great change in retardation Δnd of the liquid crystal layer LCL as the viewing angle direction changes. Therefore, the viewing angle characteristics of a TN liquid crystal display panel are generally inferior to those of an IPS liquid crystal display panel. The first viewing angle compensating layer and the second viewing angle compensating layer are formed of a polymer liquid crystal layer having a large tilt angle. When seen from the direction of the normal, the polymer liquid crystal layers are disposed such that the direction of alignment of the polymer liquid crystal layers is parallel with the direction of alignment of the liquid crystal layer LCL in proximity thereto, and the sign of the tilt angle of the polymer liquid crystal layers is opposite to the sign of the tilt angle of the liquid crystal layer LCL in proximity thereto. This compensates for the change in retardation Δnd of the liquid crystal layer LCL as the viewing angle changes in the TN liquid crystal display panel LCP, and therefore the viewing angle characteristics are improved.

When the directions of alignment of the first alignment film AL1 and the second alignment film AL2 are the short side direction and the long side direction of the liquid crystal display panel LCP, respectively, the viewing angle characteristics are therebetween, that is, symmetrical with respect to an axis which is tilted at an angle of 45 degrees with respect to four sides of the liquid crystal display panel LCP. However, it is more preferable that the viewing angle characteristics are symmetrical in a horizontal direction of the liquid crystal display panel LCP. In order to attain this, the axial directions of the optically anisotropic members of the liquid crystal display device (liquid crystal display panel LCP) according to Embodiment 7, that is, the directions of the transmission axes of the first polarizing plate PL1 and the second polarizing plate PL2 and the axial direction of the liquid crystal layer LCL may be rotated 45 degrees. In order to rotate 45 degrees the axial direction of the liquid crystal layer LCL, the directions of the alignment treatment of the first alignment film AL1 and the second alignment film AL2 may be rotated 45 degrees. Further, when the first viewing angle compensating layer and the second viewing angle compensating layer are provided, their axes (directions of alignment) are rotated 45 degrees at the same time. This makes the viewing angle characteristics of the TN liquid crystal display panel LCP symmetrical in the horizontal direction.

However, when the axial directions of the optically anisotropic members are rotated 45 degrees as described above, the transmission axis of the second polarizing plate PL2 and the directions of vibration of light which enters the second polarizing plate PL2 from the backlight form an angle of about 45 degrees, and therefore the use efficiency of light from the backlight is lowered and the brightness is lowered. As described above, the transmission efficiency when light from the backlight passes through the second polarizing plate PL2 is in proportion to $\cos^2 \theta$. The transmission efficiency when $\theta=45°$ compared with an ideal case in which $\theta=0°$ is about 50%, and the transmission efficiency is decreased to about a half. In order to attain both symmetry of the viewing angle characteristics and improvement of the use efficiency of light from the backlight, for example, a ½ wavelength plate may be disposed between the second polarizing plate PL2 and the backlight. Here, the ½ wavelength plate is, more specifically, disposed such that the ½ wavelength plate is laminated on the second polarizing plate PL2 on the backlight side. Further, here, the ½ wavelength plate is disposed such that the direction of the slow axis thereof bisects the angle formed by the transmission axis of the second polarizing plate PL2 and the direction of vibration of light from the backlight. This makes the direction of vibration of light from the backlight rotate 45 degrees in the course of passing through the ½ wavelength plate to be in parallel with the transmission axis of the second polarizing plate PL2. This may enhance the use efficiency of light even when the viewing angle characteristics of the TN liquid crystal display panel LCP are symmetrical in the horizontal direction.

Embodiment 8

The structures of the backlights in Embodiment 1 to Embodiment 5 are structures which are assumed to be applied to a small-sized liquid crystal display device used as a display portion of a cellular telephone or the like, and cases in which the number of the light sources LS is two are described.

However, the backlight including the light guide plate according to the present invention is not limited thereto, and may be applied to, for example, a liquid crystal display device used as display portions of a notebook computer or a car navigation system. In this case, the number of the light sources LS disposed at the end portion of the light guide plate (combining portion light guide plate LG1) is not limited to two, and may be three or more. Further, the size of a liquid crystal display device used as a display portion of a cellular telephone is becoming larger in recent years, and, for example, there are cases in which, in order to secure satisfactory brightness and uniform surface brightness, three or more light sources LS are necessary.

Therefore, in Embodiment 8, exemplary structures of a liquid crystal display device in which the number of the light sources LS is three or more are described in brief.

Figure 20:
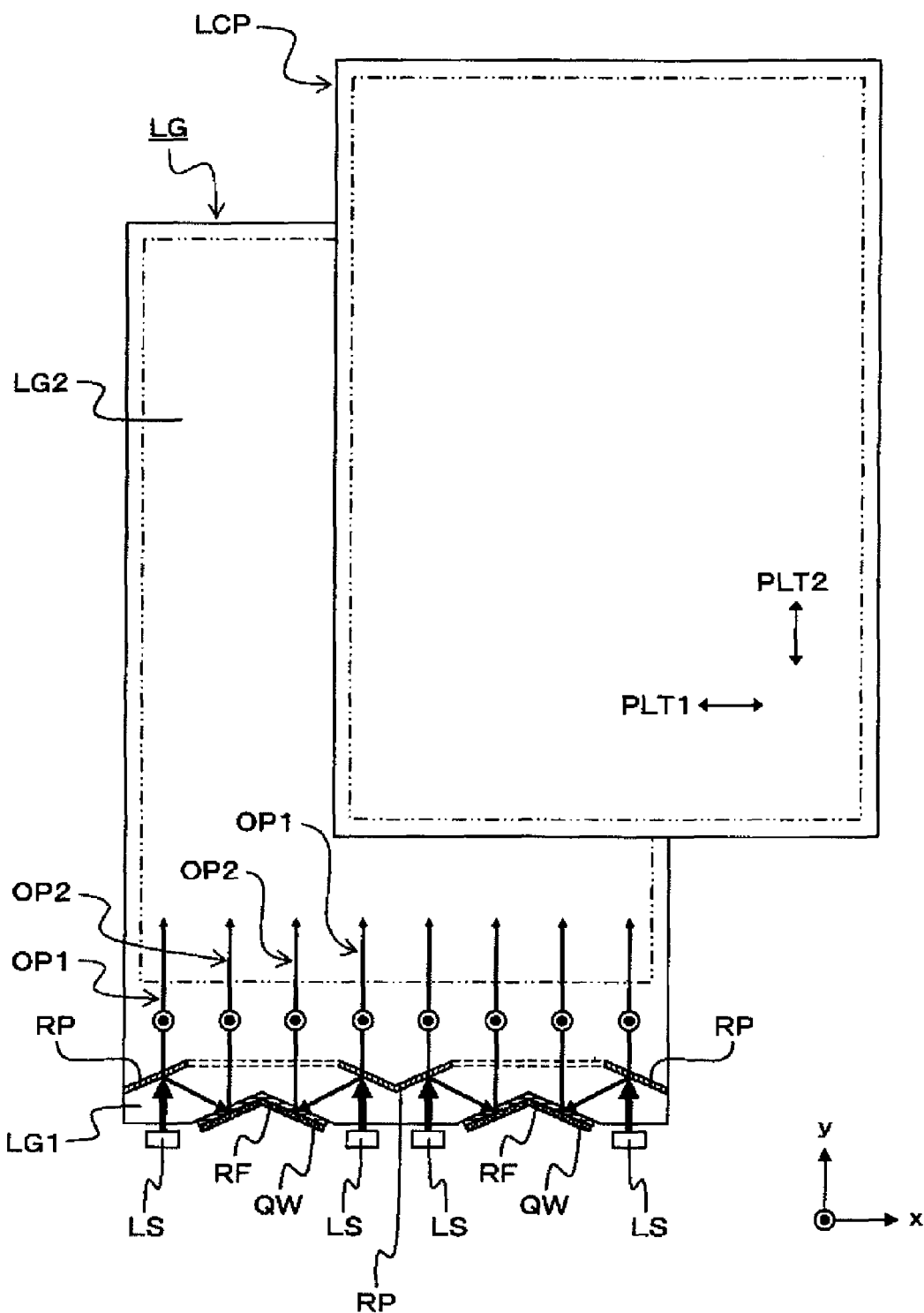
FIG. 20 is a schematic plan view illustrating a first example of a schematic structure of a main portion in a liquid crystal display device according to Embodiment 8 of the present invention.

FIG. 20 is a schematic plan view illustrating a first example of a schematic structure of a main portion in a liquid crystal display device according to Embodiment 8 of the present invention.

The size of a liquid crystal display device used as a display portion of a cellular telephone is becoming larger in recent years, and the size of the display region is, for example, about three to four inches diagonal. Further, with regard to a liquid crystal display device used as a display portion of a personal digital assistant (PDA), also, the size of the display region is, for example, about four inches diagonal. Therefore, in those liquid crystal display devices, for example, four light sources LS may be used.

When four light sources LS are disposed at the end portion of the light guide plate (combining portion light guide plate LG1), for example, as illustrated in FIG. 20, a pair of the structure described in Embodiment 2 (structure illustrated in FIG. 10) are arranged side by side in the short side direction of the combining portion light guide plate LG1 (in the x direction).

Here, light emitted from the light guide plate (surface-emitting portion light guide plate LG2) to the liquid crystal display panel LCP side is, as described above, linearly polarized light the direction of vibration of which is generally parallel with the long side direction of the liquid crystal display panel LCP. Therefore, by making the direction of a transmission axis PLT2 of the second polarizing plate PL2 of the liquid crystal display panel LCP parallel with the long side direction of the liquid crystal display panel LCP and making a transmission axis PLT1 of the first polarizing plate PL1 perpendicular to the transmission axis PLT2, the use efficiency of light from the backlight may be enhanced.

It should be noted that, when four light sources LS are used, the structure is not limited to the one illustrated in FIG. 20. It goes without saying that, for example, a pair of any of the structures described in Embodiment 1 and Embodiment 3 to Embodiment 5 may be arranged side by side.

Figure 21:
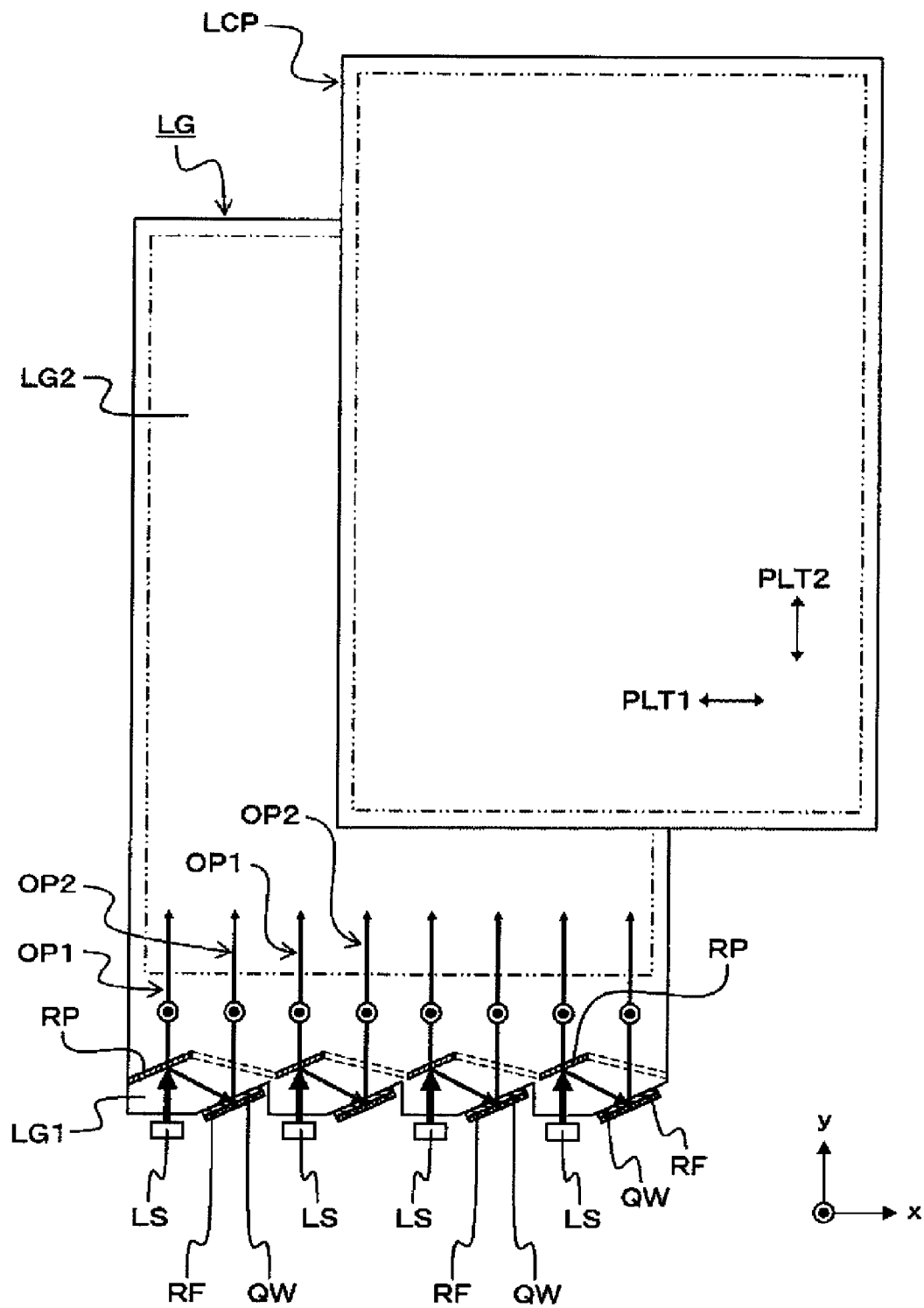
FIG. 21 is a schematic plan view illustrating a second example of the schematic structure of the main portion in the liquid crystal display device according to Embodiment 8.

FIG. 21 is a schematic plan view illustrating a second example of the schematic structure of the main portion in the liquid crystal display device according to Embodiment 8 of the present invention.

When four light sources LS are disposed at the end portion of the light guide plate (combining portion light guide plate LG1) as illustrated in FIG. 20, with regard to light which propagates in the light guide plate (surface-emitting portion light guide plate LG2), light which propagates in a center portion and both end portions is light which passes through the reflective polarizing plate RP only once (light which propagates along the first optical paths OP1) and light which propagates between the center portion and the end portions is light which is reflected by the reflective polarizing plate RP and then converted to a P-polarized component (light which propagates along the second optical paths OP2). Therefore, in this case, for example, decreased uniformity of surface brightness due to difference between the brightness in the center portion and both the end portions and the brightness between the center portion and the end portions is a concern.

Further, when four light sources LS are disposed at the end portion of the light guide plate (combining portion light guide plate LG1) as illustrated in FIG. 20, because the distance between the two light sources LS at the center is small, for example, reduced heat radiation from the two light sources LS resulting in lowered light emission efficiency due to temperature rise during use for a long time period is a concern.

Therefore, when four light sources LS are disposed at the end portion of the light guide plate (combining portion light guide plate LG1), for example, as illustrated in FIG. 21, the arrangement of the reflective polarizing plates RP, the ¼ wavelength plates QW, and the reflectors RF may be changed so that the light sources LS are spaced uniformly.

With such a structure, with regard to light which propagates in the light guide plate (surface-emitting portion light guide plate LG2), light which passes through the reflective polarizing plate RP only once (light which propagates along the first optical paths OP1) and light which is reflected by the reflective polarizing plate RP and then converted to a P-polarized component (light which propagates along the second optical paths OP2) are alternately arranged. Therefore, for example, decreased uniformity of surface brightness due to difference between the intensity of light which passes through the reflective polarizing plate RP only once and the intensity of light which is reflected by the reflective polarizing plate RP and then converted to a P-polarized component is thought to become less conspicuous. Further, by spacing the light sources LS uniformly in this way, interference with an adjacent light sources LS may be prevented, to thereby suppress reduction of heat radiation.

It should be noted that, when the light sources LS are spaced uniformly, also, the structure for converting an S-polarized component of light from the light sources LS to a P-polarized component is not limited to the one illustrated in FIG. 21, and may be any of the structures described in Embodiment 1 to Embodiment 5.

FIG. 22 is a schematic plan view illustrating a third example of the schematic structure of the main portion in the liquid crystal display device according to Embodiment 8 of the present invention.

A liquid crystal display device with a backlight including a light guide plate is also used as, for example, a display portion of a notebook computer or a car navigation system. Because the diagonal sizes of those liquid crystal display devices are still larger, in order to secure satisfactory brightness and uniform surface brightness, still more light sources LS are necessary.

Further, a liquid crystal display device used as a display portion of a notebook computer or the like has generally a horizontally oriented screen (display region), and the direction of extension of the scanning signal line GL is the long side direction of the liquid crystal display panel LCP.

Therefore, when the present invention is applied to a light guide plate of a liquid crystal display device used as a display portion of a notebook computer or the like, for example, as illustrated in FIG. 22, a plurality of light sources LS are disposed along each of the two long sides of the liquid crystal display panel LCP. Here, the reflective polarizing plates RP, the ¼ wavelength plates QW, and the reflectors RF are disposed in the way illustrated in FIG. 21 such that the light sources LS are spaced uniformly.

With the structure illustrated in FIG. 22, the relationship between the directions of travel of light from the light sources (first optical paths OP1 and second optical paths OP2) and the long side and the short side of the liquid crystal display panel LCP is opposite to that of the structures described in Embodiment 1 to Embodiment 5. Therefore, with the structure illustrated in FIG. 22, light emitted from the light guide plate (surface-emitting portion light guide plate LG2) to the liquid crystal display panel LCP side is linearly polarized light the direction of vibration of which is generally parallel with the short side direction of the liquid crystal display panel LCP (y direction). Therefore, in the liquid crystal display device with such structure, by making the direction of the transmission axis PLT2 of the second polarizing plate PL2 of the liquid crystal display panel LCP the short side direction of the liquid crystal display panel LCP and making the transmission axis PLT1 of the first polarizing plate PL1 perpendicular to the transmission axis PLT2, the use efficiency of light from the backlight may be enhanced.

FIG. 23 is a schematic plan view illustrating a forth example of the schematic structure of the main portion in the liquid crystal display device according to Embodiment 8 of the present invention.

With the structure of the backlight illustrated in FIG. 22, the light sources LS, the reflective polarizing plates RP, the ¼ wavelength plates QW, and the reflectors RF disposed along the two long sides of the light guide plate are symmetrical with respect to an axis in the long side direction (in the x direction).

However, when the light sources LS are disposed along each of the two long sides of the light guide plate, for example, as illustrated in FIG. 23, the light sources LS, the reflective polarizing plates RP, the ¼ wavelength plates QW, and the reflectors RF disposed along the two long sides of the light guide plate may be 180 degree rotationally symmetrical with respect to an axis in the direction of the normal to the light guide plate (in the z direction) at the center.

FIG. 24 is a schematic plan view illustrating a fifth example of the schematic structure of the main portion in the liquid crystal display device according to Embodiment 8.

With the structure of the backlight illustrated in FIG. 22, the locations of the first optical paths OP1 from the light sources LS along the upper long side of the light guide plate and the locations of the first optical paths OP1 from the light sources LS along the lower long side of the light guide plate are the same in the x direction.

However, when the light sources LS are disposed along each of the two long sides of the light guide plate, for example, as illustrated in FIG. 24, the locations of the first optical paths OP1 from the light sources LS along the upper long side of the light guide plate and the locations of the first optical paths OP1 from the light sources LS along the lower long side of the light guide plate in the x direction may be shifted by W/2 which is half of the distance W between a first optical path OP1 and an adjacent second optical path OP2.

FIG. 25 is a schematic plan view illustrating a sixth example of the schematic structure of the main portion in the liquid crystal display device according to Embodiment 8 of the present invention.

With the structures of the backlights illustrated in FIGS. 22 to 24, the light sources LS are disposed along each of the two long sides of the light guide plate.

However, when the present invention is applied to a light guide plate of a liquid crystal display device used as a display portion of a notebook computer or the like, the arrangement is not limited thereto, and, for example, as illustrated in FIG. 25, a plurality of light sources LS may be disposed along each of the two short sides of the liquid crystal display panel LCP. Here, the reflective polarizing plates RP, the ¼ wavelength plates QW, and the reflectors RF are disposed in the way illustrated in FIG. 21 such that the light sources LS are spaced uniformly.

With such a structure, the relationship between the directions of travel of light (first optical paths OP1 and second optical paths OP2) and the long side and the short side of the liquid crystal display panel LCP is the same as that of the structures described in Embodiment 1 to Embodiment 5. Therefore, with the structure illustrated in FIG. 25, light emitted from the light guide plate (surface-emitting portion light guide plate LG2) to the liquid crystal display panel LCP side is linearly polarized light the direction of vibration of which is generally parallel with the long side direction of the liquid crystal display panel LCP (x direction). Therefore, in the liquid crystal display device with such structure, by making the direction of the transmission axis PLT2 of the second polarizing plate PL2 of the liquid crystal display panel LCP parallel with the long side direction of the liquid crystal display panel LCP and making the transmission axis PLT1 of the first polarizing plate PL1 perpendicular to the transmission axis PLT2, the use efficiency of light from the backlight may be enhanced.

It should be noted that the structures of the backlights illustrated in FIGS. 20 to 25 and described in Embodiment 8 are exemplary structures of the backlights when three or more light sources LS are used. It goes without saying that, when the present invention is applied to a backlight including a light guide plate in which three or more light sources LS are used, the structure is not limited thereto and any of the structures described in Embodiment 1 to Embodiment 5 may be applied.

By the way, as described above, the liquid crystal display device with a backlight including a light guide plate according to the present invention is mainly used as a display portion of portable information equipment and is often used outdoors.

In the outdoors, there is, in addition to light directly applied from a light source (sun or illuminating device) or the like, for example, reflected light from a road, a water surface, or the like. Such reflected light interferes in driving a car, fishing, or the like. All of such reflected light is, because it is light reflected by a horizontal surface, linearly polarized light the direction of vibration of which is in a horizontal plane. In recent years, in order to eliminate such linearly polarized light, polarized sunglasses including a polarizing plate the absorption axis of which is in the horizontal direction are becoming popular.

Therefore, a liquid crystal display device to which the present invention is applied is required to be observable by a person with polarized sunglasses. More specifically, in a liquid crystal display device to which the present invention is applied and which is assumed to be used outdoors, it is preferable that the transmission axis PLT1 of the first polarizing plate PL1 on the user tilts side enough from the horizontal direction, and it is ideal that the transmission axis PLT1 is perpendicular to the horizontal direction.

When the present invention is applied to a large-screen liquid crystal display device, it is thought to be used as, for example, a display device for street advertisement. Such a display device is assumed to be installed with the long sides of the liquid crystal display panel LCP being in the horizontal direction. Therefore, in order to make such a display device observable by a person with polarized sunglasses, it is desirable that the direction of the transmission axis PLT1 of the first polarizing plate PL1 which the person observes is perpendicular to the long sides. Therefore, when the present invention is applied to a liquid crystal display device which is installed with the long sides of the liquid crystal display panel LCP being in the horizontal direction, it is desirable that the structure of the backlight is, for example, as illustrated in FIG. 25.

Further, a large-screen liquid crystal display device may be formed by, for example, arranging a plurality of liquid crystal display panels to form one large screen (large-display-region). Such a liquid crystal display device may be installed with the short sides of the liquid crystal display panel LCP being in the horizontal direction. In such a case, in order to make the liquid crystal display device observable by a person with polarized sunglasses, it is desirable that the transmission axis PLT1 of the first polarizing plate PL1 which the person observes is in parallel with the long sides. Therefore, when the present invention is applied to a liquid crystal display device which is installed with the short sides of the liquid crystal display panel LCP being in the horizontal direction, it is desirable that the structure of the backlight is, for example, as illustrated in FIG. 22.

As described above, the liquid crystal display device according to Embodiment 8 becomes observable by a person with polarized sunglasses by selecting sides along which the light sources LS are disposed according to the direction of the liquid crystal display panel LCP when used.

The present invention is specifically described based on the embodiments above, but the present invention is not limited thereto, and it goes without saying that various modifications are possible without departing from the gist of the present invention.

For example, in Embodiment 1, as exemplary light extraction structures MP provided on the light guide plate LG (surface-emitting portion light guide plate LG2), the prism-like protrusions illustrated in FIG. 1 are described, but the light extraction structures MP is not limited thereto, and may be, for example, protrusions having a convex curved surface or a concave curved surface. Further, the light extraction structures MP may be, for example, stripe-like reflection grooves which extend generally perpendicularly to the first optical path OP1 and the second optical path OP2.

Further, the structure of the liquid crystal display panel LCP may be, for example, such that one or more layers of retarder are disposed between the first substrate SU1 and the first polarizing plate PL1, and between the second substrate SU2 and the second polarizing plate PL2.

Further, in the liquid crystal display panel LCP in the embodiments described in the above, the first polarizing plate PL1 and the second polarizing plate PL2 are disposed so as to sandwich the first substrate SU1, the second substrate SU2, and the liquid crystal layer LCL therebetween. However, because it is enough that the first polarizing plate PL1 and the second polarizing plate PL2 are disposed so as to sandwich the liquid crystal layer LCL therebetween, for example, the second polarizing plate PL2 may be disposed between the second substrate SU2 and the liquid crystal layer LCL.

Still further, the liquid crystal display panel LCP may be formed by, for example, using a liquid crystal material having a blue phase, a liquid crystal material having cubic symmetry, or the like in the liquid crystal layer LCL, and may be without the first alignment film AL1 and the second alignment film AL2.

By using the liquid crystal display device according to the present invention as a display portion of mobile equipment such as a cellular telephone or a digital camera, image display of high brightness and excellent visibility may be obtained and battery consumption may be suppressed. Further, when the liquid crystal display device according to the present invention is used in a large-screen TV set or a large display for a computer, display of higher brightness may be obtained with the same power consumption.

What is claimed is:

1. A liquid crystal display device, comprising:
   a liquid crystal display panel;
   a light guide plate disposed on a rear surface side of the liquid crystal display panel; and
   a plurality of light sources disposed at an end portion of the light guide plate, wherein:
   the plurality of light sources are disposed such that a direction of travel of light which is a main component in view of intensity distribution of light emitted from the plurality of light sources is substantially in parallel with respect to at least one of four sides of the liquid crystal display panel,
   the light guide plate includes:
      a reflective polarizing plate for transmitting a P-polarized component and reflecting an S-polarized component of the light emitted from the plurality of light sources, the reflective polarizing plate being between the end portion which the light emitted from the plurality of light sources enters and a light extraction portion at which light propagating in the light guide plate is extracted to a side of the liquid crystal display panel;
      a reflector for reflecting the S-polarized component of light reflected by the reflective polarizing plate; and
      a polarization converting member for converting the S-polarized component of light to a P-polarized component;
   the reflective polarizing plate and the reflector are tilted at an angle such that reflecting surfaces thereof are not perpendicular with respect to the direction of travel of the main component of light and are disposed such that the P-polarized component obtained by converting the S-polarized component of the main component of light with the polarization converting member is directed substantially in parallel with the direction of travel of the main component of light, and
   the polarization converting member is disposed at a location which is on a pathway of light reflected by the reflective polarizing plate but is not on a pathway of the main component of light which is before passing through the reflective polarizing plate.

2. The liquid crystal display device according to claim 1, wherein
the polarization converting member comprises a ¼ wavelength plate, and
the ¼ wavelength plate is disposed at a location such that the light after a reflection of the reflective polarizing plate passes through the ¼ wavelength plate twice in a pathway that the light is reflected by the reflector and is directed to the light extraction portion.

3. The liquid crystal display device according to claim 1, wherein
the polarization converting member comprises a ¼ wavelength plate, and
the ¼ wavelength plate and the reflector are laminated in the stated order from a side closer to the light guide plate, and the ¼ wavelength plate is disposed such that a slow axis thereof forms an angle of 45 degrees with respect to a thickness direction of the light guide plate.

4. The liquid crystal display device according to claim 1, wherein the reflective polarizing plate is disposed only at a location where the main component of light containing the P-polarized component and the S-polarized component passes through, and is not disposed at a location where light reflected by the reflector passes through.

5. The liquid crystal display device according to claim 1, wherein
the polarization converting member comprises a ½ wavelength plate,
the reflective polarizing plate is disposed only at a location where the main component of light containing the P-polarized component and the S-polarized component passes through, and
the ½ wavelength plate is disposed at a location such that the light after being reflected by the reflective polarizing plate passes through the ½ wavelength plate once in a pathway that the light is reflected by the reflector and is directed to the light extraction portion and such that a slow axis thereof forms an angle of 45 degrees with respect to a thickness direction of the light guide plate.

6. The liquid crystal display device according to claim 1, wherein
the reflective polarizing plate comprises a laminate formed by alternately laminating an anisotropic medium having refractive index anisotropy and an isotropic medium not having the refractive index anisotropy, and
the anisotropic medium is formed such that any one of an extraordinary refractive index and an ordinary refractive index in a layer plane of the laminate is equal to a refractive index of the isotropic medium.

7. The liquid crystal display device according to claim 1, wherein at least one of the reflective polarizing plate and the reflector is formed such that profile thereof in plan view of the plane which is opposed to the liquid crystal display panel is a curve which is concave with respect to incident light.

8. The liquid crystal display device according to claim 1, wherein the reflector comprises a metal thin film having a high reflectivity.

9. The liquid crystal display device according to claim 1, wherein
the light guide plate comprises a combining portion light guide plate and a surface-emitting portion light guide plate,
the combining portion light guide plate and the surface-emitting portion light guide plate have junction surfaces, respectively, which are opposed to each other and made to be in the same shapes,
the plurality of light sources are disposed in proximity to an end portion of the combining portion light guide plate which is different from the junction surfaces,
the reflective polarizing plate is formed on the junction surfaces of one of the combining portion light guide plate and the surface-emitting portion light guide plate, and
the reflector is formed at the end portion of the combining portion light guide plate which is different from the junction surfaces.

10. The liquid crystal display device according to claim 1, wherein
the liquid crystal display panel comprises:
a pair of substrates;
a liquid crystal layer sandwiched between the pair of substrates; and
a pair of polarizing plates disposed so as to sandwich the liquid crystal layer therebetween, and
a polarizing plate of the pair of polarizing plates, which is disposed between the liquid crystal layer and the light guide plate, is made such that a direction of a transmission axis thereof is substantially in parallel with respect to the direction of travel of the main component of light in the light guide plate.

11. The liquid crystal display device according to claim 10, wherein the pair of polarizing plates are disposed so as to sandwich the pair of substrates and the liquid crystal layer.

12. The liquid crystal display device according to claim 10, wherein
the liquid crystal display panel comprises a pixel electrode and a common electrode on a surface of one substrate of the pair of substrates in proximity to the liquid crystal layer,
the pixel electrode and the common electrode are formed in the same layer and have a comb-shaped structure in plan view, and
the pixel electrode and the common electrode are formed such that a longitudinal direction of teeth portions of the comb-shaped structure of the pixel electrode and the common electrode is substantially in parallel with respect to the direction of travel of the main component of light.

13. The liquid crystal display device according to claim 10, wherein
the liquid crystal display panel comprises a pixel electrode and a common electrode on a surface of one substrate of the pair of substrates in proximity to the liquid crystal layer,
the pixel electrode and the common electrode are laminated via an insulating layer and a closer electrode among the pixel electrode and the common electrode to the liquid crystal layer has a comb-shaped structure in plan view, and
the comb-shaped structure is formed such that a longitudinal direction of teeth portions thereof is substantially in parallel with respect to the direction of travel of the main component of light.

14. A liquid crystal display device, comprising:
a liquid crystal display panel;
a light guide plate disposed on a rear surface side of the liquid crystal display panel; and
a plurality of light sources disposed at an end portion of the light guide plate, wherein the plurality of light sources are disposed such that a direction of travel of light which is a main component in view of intensity distribution of light emitted from the plurality of light sources is substantially in parallel with respect to at least one of four sides of the liquid crystal display panel, the light guide plate includes:
- a reflective polarizing plate for separating the light emitted from the plurality of light sources into circularly polarized light of clockwise and circularly polarized light of counterclockwise and transmitting one circularly polarized light and reflects another circularly polarized light, the reflective polarizing plate being disposed between the end portion which the light emitted from the plurality of light sources enters and a light extraction portion at which light propagating in the light guide plate is extracted to a side of the liquid crystal display panel;
- a reflector for reflecting the another circularly polarized light reflected by the reflective polarizing plate; and
- a polarization converting member for converting the one circularly polarized light which passes through the reflective polarizing plate and the another circularly polarized light reflected by the reflector to a P-polarized component, and the reflective polarizing plate and the reflector are tilted at an angle such that reflecting surfaces thereof are not perpendicular with respect to the direction of travel of the main component of light and are disposed such that the P-polarized component obtained by converting the another circularly polarized light reflected by the reflective polarizing plate of the main component of light with the polarization converting member is directed substantially in parallel with the direction of travel of the main component of light.

15. The liquid crystal display device according to claim 14, wherein
- the reflective polarizing plate comprises a laminate of cholesteric liquid crystal layers which exhibits characteristic reflection in wavelength range of the light emitted from the plurality of light sources,
- the polarization converting member comprises a ¼ wavelength plate, and
- the ¼ wavelength plate is disposed such that a slow axis thereof forms an angle of 45 degrees with respect to a thickness direction of the light guide plate.

16. The liquid crystal display device according to claim 14, wherein
- the reflective polarizing plate includes a polymer liquid crystal layer having a twisted alignment, and
- the twisted alignment is formed such that a twist angle thereof is 90 degrees and a direction of alignment in a surface thereof in proximity to the plurality of light sources is either one of perpendicular to or in parallel with a thickness direction of the light guide plate.

* * * * *